United States Patent
Arrasmith et al.

(10) Patent No.: US 12,249,434 B2
(45) Date of Patent: Mar. 11, 2025

(54) THERMAL EXPANSION SUPPORT SYSTEM AND METHODS OF USE THEREOF

(71) Applicant: ABILENE CHRISTIAN UNIVERSITY, Abilene, TX (US)

(72) Inventors: Michael Arrasmith, Abilene, TX (US); Thomas Bailey, Abilene, TX (US); Samuel Lopez, Abilene, TX (US)

(73) Assignee: Abilene Christian University, Abilene, TX (US)

( * ) Notice: Subject to any disclaimer, the term of this patent is extended or adjusted under 35 U.S.C. 154(b) by 116 days.

(21) Appl. No.: 18/194,125

(22) Filed: Mar. 31, 2023

(65) Prior Publication Data

US 2024/0331884 A1 Oct. 3, 2024

(51) Int. Cl.
*G21C 13/04* (2006.01)
*F16L 3/16* (2006.01)

(52) U.S. Cl.
CPC ............... *G21C 13/04* (2013.01); *F16L 3/16* (2013.01)

(58) Field of Classification Search
CPC .................................. G21C 13/04; F16L 3/16
USPC ...................................................... 248/123.2
See application file for complete search history.

(56) References Cited

U.S. PATENT DOCUMENTS

| | | | |
|---|---|---|---|
| 2,354,694 A * | 8/1944 | McGill | C02F 1/42 137/625.48 |
| 2,669,465 A | 2/1954 | Newell | |
| 3,471,181 A | 10/1969 | Fuentes | |
| 3,972,547 A | 8/1976 | Itoya | |
| 4,140,292 A * | 2/1979 | Kaigler, Jr. | F16L 3/16 405/184.5 |
| 4,539,846 A | 9/1985 | Grossman | |
| 5,016,920 A | 5/1991 | Anderson | |
| 5,630,592 A | 5/1997 | Obara et al. | |
| 6,125,912 A | 10/2000 | Branagan et al. | |
| 6,186,159 B1 | 2/2001 | DeGood | |
| 7,160,367 B2 | 1/2007 | Babicki | |
| 7,400,697 B1 | 7/2008 | Carmack et al. | |
| 7,648,792 B2 | 1/2010 | Kaschmitter | |

(Continued)

FOREIGN PATENT DOCUMENTS

| | | |
|---|---|---|
| CN | 102878109 | 11/2014 |
| CN | 104214420 | 12/2014 |

(Continued)

*Primary Examiner* — Muhammad Ijaz
(74) *Attorney, Agent, or Firm* — King & Spalding LLP

(57) ABSTRACT

In one embodiment, the example thermal expansion support systems decrease the stress within the one or more components and piping segments within a high temperature system caused by thermal expansion. The exemplary thermal expansion support systems may provide a counterbalancing force on the components and piping segments of the high temperature system, which may allow the components and piping segments a free range of motion to counterbalance the stress caused by thermal expansion of the high temperature system. In some embodiments, one example thermal expansion support system may utilize a counterweight system. In another embodiment, an example thermal expansion support system may utilize active system components, such as actuators, hydraulics, electric motors, or other similar devices to provide a counterbalancing force on the one or more components of the high temperature system.

16 Claims, 19 Drawing Sheets

(56) References Cited

U.S. PATENT DOCUMENTS

| | | |
|---|---|---|
| 7,707,987 B2 | 5/2010 | Guthrie |
| 7,931,080 B2 | 4/2011 | O'Brien |
| 7,980,304 B2 | 7/2011 | O'Brien |
| 8,186,430 B2 | 5/2012 | O'Brien |
| 8,238,509 B2 | 8/2012 | Moen et al. |
| 8,636,892 B2 | 1/2014 | Koehl et al. |
| 8,703,063 B2 | 4/2014 | Hottovy |
| 8,746,440 B2 | 6/2014 | Williamson et al. |
| 8,767,905 B2 | 7/2014 | Neeley et al. |
| 8,771,482 B2 | 7/2014 | Bailey et al. |
| 8,900,439 B2 | 12/2014 | Wiedmeyer et al. |
| 8,956,524 B2 | 2/2015 | Wiedmeyer et al. |
| 9,008,257 B2 | 4/2015 | Hyde et al. |
| 9,017,527 B2 | 4/2015 | Wiedmeyer et al. |
| 9,074,922 B2 | 7/2015 | Dayal et al. |
| 9,150,975 B2 | 10/2015 | Berger et al. |
| 9,208,909 B2 | 12/2015 | Runkle et al. |
| 9,224,507 B2 | 12/2015 | Heinold et al. |
| 9,251,920 B2 | 2/2016 | Loewen et al. |
| 9,305,673 B2 | 4/2016 | Heinold et al. |
| 9,324,465 B2 | 4/2016 | Splichal, Jr. |
| 9,368,238 B2 | 6/2016 | Theofanous et al. |
| 9,368,241 B2 | 6/2016 | Loewen et al. |
| 9,376,639 B2 | 6/2016 | Walter et al. |
| 9,388,917 B2 * | 7/2016 | Huang .............. F16L 1/20 |
| 9,460,818 B2 | 10/2016 | Bergman |
| 9,475,706 B2 | 10/2016 | Policke et al. |
| 9,522,462 B2 | 12/2016 | Baker et al. |
| 9,691,507 B2 | 6/2017 | Hyde et al. |
| 9,691,508 B2 | 6/2017 | Hyde et al. |
| 9,728,288 B2 | 8/2017 | Hyde et al. |
| 9,748,007 B2 | 8/2017 | Hyde et al. |
| 9,761,336 B2 | 9/2017 | Caine et al. |
| 9,761,337 B2 | 9/2017 | Hyde et al. |
| 9,799,417 B2 | 10/2017 | Hyde et al. |
| 9,875,817 B2 | 1/2018 | Edwards et al. |
| 9,875,818 B2 | 1/2018 | Mark et al. |
| 9,881,700 B2 | 1/2018 | LeBlanc |
| 9,892,807 B2 | 2/2018 | Hyde et al. |
| 9,894,802 B2 | 2/2018 | Loewen et al. |
| 9,911,514 B2 | 3/2018 | Edwards et al. |
| 9,921,158 B2 | 3/2018 | Rider |
| 9,941,025 B2 | 4/2018 | Ahlfeld et al. |
| 10,041,163 B1 | 8/2018 | Offer et al. |
| 10,056,160 B2 | 8/2018 | LeBlanc |
| 10,141,079 B2 | 11/2018 | Czerwinski et al. |
| 10,144,874 B2 | 12/2018 | Walter |
| 10,147,506 B2 | 12/2018 | Malloy, III et al. |
| 10,176,901 B2 | 1/2019 | Loewen |
| 10,197,200 B2 | 2/2019 | Kolb et al. |
| 10,221,499 B2 | 3/2019 | Miller et al. |
| 10,229,757 B2 | 3/2019 | Filippone |
| 10,280,527 B2 | 5/2019 | Loewen et al. |
| 10,290,381 B2 | 5/2019 | Caine et al. |
| 10,311,981 B2 | 6/2019 | Hackett et al. |
| 10,343,102 B2 | 7/2019 | Reasoner |
| 10,438,705 B2 | 10/2019 | Cheatham, III |
| 10,497,479 B2 | 12/2019 | Abbott |
| 10,497,480 B2 | 12/2019 | Cheatham, III et al. |
| 10,515,729 B2 | 12/2019 | Horn et al. |
| 10,535,437 B2 | 1/2020 | Hyde et al. |
| 10,566,096 B2 | 2/2020 | Czerwinski |
| 10,573,416 B2 | 2/2020 | Venneri |
| 10,636,532 B2 | 4/2020 | Anderson et al. |
| 10,643,754 B2 | 5/2020 | Venneri |
| 10,650,934 B2 | 5/2020 | Caine et al. |
| 10,665,356 B2 | 5/2020 | Abbott |
| 10,685,750 B2 | 6/2020 | Eichel et al. |
| 10,734,122 B2 | 8/2020 | Cisneros, Jr. |
| 10,738,367 B2 | 8/2020 | Hackett |
| 10,741,293 B2 | 8/2020 | Abbott |
| 10,755,822 B2 | 8/2020 | Gibbons et al. |
| 10,760,004 B2 | 9/2020 | Garcia-Perez et al. |
| 10,787,609 B2 | 9/2020 | Garcia-Perez et al. |
| 10,787,610 B2 | 9/2020 | Goodrich et al. |
| 10,825,571 B2 | 11/2020 | Edwards et al. |
| 10,867,710 B2 | 12/2020 | Cisneros, Jr. |
| 10,923,238 B2 | 2/2021 | Abbott |
| 10,937,557 B2 | 3/2021 | Sineath et al. |
| 10,962,461 B2 | 3/2021 | Linneen |
| 11,028,303 B2 | 6/2021 | Corbin et al. |
| 11,031,140 B2 | 6/2021 | Hunt et al. |
| 11,043,309 B2 | 6/2021 | Nygaard et al. |
| 11,049,624 B2 | 6/2021 | Loewen et al. |
| 11,075,013 B2 | 7/2021 | Abbott et al. |
| 11,075,015 B2 | 7/2021 | Cisneros, Jr. |
| 11,133,114 B2 | 9/2021 | Hackett et al. |
| 11,136,245 B2 | 10/2021 | Benson |
| 11,145,424 B2 | 10/2021 | Abbott |
| 11,149,623 B2 | 10/2021 | Kutsch |
| 11,170,901 B2 | 11/2021 | Cheatham, III |
| 11,200,991 B2 | 12/2021 | LeBlanc |
| 11,205,523 B2 | 12/2021 | Hyde et al. |
| 11,257,600 B2 | 2/2022 | Anderson et al. |
| 11,264,141 B2 | 3/2022 | Venneri |
| 11,276,503 B2 | 3/2022 | Cisneros, Jr. et al. |
| 11,289,212 B2 | 3/2022 | Inman et al. |
| 11,342,084 B2 | 5/2022 | Cheatham, III et al. |
| 11,342,085 B2 | 5/2022 | Hinds |
| 11,367,536 B2 | 6/2022 | Abbott |
| 11,373,765 B2 | 6/2022 | Czerwinski |
| 11,373,769 B2 | 6/2022 | Hinds |
| 11,380,450 B2 | 7/2022 | Sineath et al. |
| 11,417,435 B2 | 8/2022 | Nelson |
| 11,417,437 B2 | 8/2022 | Venneri |
| 11,424,041 B2 | 8/2022 | Fisher et al. |
| 11,428,564 B2 | 8/2022 | Dayal et al. |
| 11,434,429 B2 | 9/2022 | Goodrich et al. |
| 11,437,156 B2 | 9/2022 | Russell, II et al. |
| 11,443,859 B2 | 9/2022 | Bass et al. |
| 11,482,345 B2 | 10/2022 | Hunt et al. |
| 11,488,731 B2 | 11/2022 | Abbott |
| 11,495,363 B2 | 11/2022 | Gramlich et al. |
| 11,501,883 B2 | 11/2022 | Eichel et al. |
| 11,542,437 B2 | 1/2023 | Garcia-Perez et al. |
| 11,545,274 B2 | 1/2023 | Bass et al. |
| 11,569,000 B2 | 1/2023 | Hinds |
| 11,574,094 B2 | 2/2023 | Pivovar et al. |
| 2006/0000007 A1 | 1/2006 | Lin |
| 2007/0001933 A1 | 1/2007 | Hoffmann |
| 2009/0046825 A1 | 2/2009 | Dulka et al. |
| 2009/0173491 A1 | 7/2009 | O'Brien |
| 2012/0012330 A1 | 1/2012 | Botich |
| 2012/0082911 A1 | 4/2012 | Hyde et al. |
| 2012/0082913 A1 | 4/2012 | Hyde et al. |
| 2012/0087455 A1 | 4/2012 | Hyde et al. |
| 2013/0083878 A1 | 4/2013 | Massie et al. |
| 2014/0185733 A1 | 7/2014 | Povirk et al. |
| 2015/0228363 A1 | 8/2015 | Dewan et al. |
| 2015/0310948 A1 | 10/2015 | Venneri |
| 2016/0189812 A1 | 6/2016 | Czerwinski |
| 2016/0189813 A1 | 6/2016 | Cisneros, Jr. |
| 2016/0217874 A1 | 7/2016 | Dewan et al. |
| 2016/0272903 A1 | 9/2016 | Walter et al. |
| 2017/0206984 A1 | 7/2017 | Lee et al. |
| 2017/0271033 A1 | 9/2017 | Dodson et al. |
| 2017/0292179 A1 | 10/2017 | Hackett |
| 2017/0294240 A1 | 10/2017 | Baglietto et al. |
| 2017/0294241 A1 | 10/2017 | Dodson et al. |
| 2017/0301413 A1 | 10/2017 | Cisneros, Jr. |
| 2017/0301418 A1 | 10/2017 | Dodson et al. |
| 2017/0316840 A1 | 11/2017 | Abbott |
| 2018/0030576 A1 | 2/2018 | Urza |
| 2018/0244535 A1 | 8/2018 | Russell, II et al. |
| 2018/0254109 A1 | 9/2018 | Cheatham, III et al. |
| 2018/0322968 A1 | 11/2018 | Cheatham, III et al. |
| 2019/0035510 A1 | 1/2019 | LeBlanc |
| 2019/0057783 A1 | 2/2019 | LeBlanc |
| 2019/0066857 A1 | 2/2019 | Hackett et al. |
| 2019/0139665 A1 | 5/2019 | Czerwinski et al. |
| 2019/0203614 A1 | 7/2019 | Loewen et al. |
| 2019/0371482 A1 | 12/2019 | Benson |
| 2020/0027581 A1 | 1/2020 | Hackett et al. |
| 2020/0087156 A1 | 3/2020 | Kelleher |

(56) References Cited

U.S. PATENT DOCUMENTS

| | | | |
|---|---|---|---|
| 2020/0122109 A1 | 4/2020 | Kruizenga et al. |
| 2020/0161015 A1 | 5/2020 | Czerwinski et al. |
| 2020/0373024 A1 | 11/2020 | Gramlich |
| 2020/0393123 A1 | 12/2020 | Aly |
| 2021/0047199 A1 | 2/2021 | Russell, II et al. |
| 2021/0047568 A1 | 2/2021 | Goodrich et al. |
| 2021/0095645 A1 | 4/2021 | Cheatham, III |
| 2021/0130181 A1 | 5/2021 | Brown et al. |
| 2021/0170676 A1 | 6/2021 | Kitchen et al. |
| 2021/0210224 A1 | 7/2021 | Cisneros, Jr. |
| 2021/0272707 A1 | 9/2021 | Wardle |
| 2021/0272708 A1 | 9/2021 | Cisneros, Jr. |
| 2021/0287814 A1 | 9/2021 | Loewen et al. |
| 2021/0302295 A1 | 9/2021 | Linneen |
| 2021/0304909 A1 | 9/2021 | Gramlich et al. |
| 2021/0313081 A1 | 10/2021 | Nygaard et al. |
| 2021/0318673 A1 | 10/2021 | Kitchen et al. |
| 2021/0319920 A1 | 10/2021 | Nelson |
| 2021/0343431 A1 | 11/2021 | Cisneros, Jr. |
| 2022/0005619 A1 | 1/2022 | Cisneros, Jr. |
| 2022/0017382 A1 | 1/2022 | Russell, II et al. |
| 2022/0051814 A1 | 2/2022 | Freeman et al. |
| 2022/0051816 A1 | 2/2022 | Freeman |
| 2022/0051817 A1 | 2/2022 | Hejzlar et al. |
| 2022/0051818 A1 | 2/2022 | Cisneros, Jr. |
| 2022/0051820 A1 | 2/2022 | Corbin |
| 2022/0068512 A1 | 3/2022 | Russell, II et al. |
| 2022/0081317 A1 | 3/2022 | Russell, II et al. |
| 2022/0115149 A1 | 4/2022 | Barringer et al. |
| 2022/0115150 A1 | 4/2022 | Hackett et al. |
| 2022/0115152 A1 | 4/2022 | Barringer et al. |
| 2022/0139576 A1 | 5/2022 | Inman et al. |
| 2022/0139577 A1 | 5/2022 | Cisneros, Jr. et al. |
| 2022/0139578 A1 | 5/2022 | Venneri et al. |
| 2022/0250936 A1 | 8/2022 | Benson |
| 2022/0254524 A1 | 8/2022 | Cheatham, III et al. |
| 2022/0301729 A1 | 9/2022 | Cisneros, Jr. |
| 2022/0301732 A1 | 9/2022 | Cisneros, Jr. et al. |
| 2022/0310278 A1 | 9/2022 | Choi et al. |
| 2022/0310281 A1 | 9/2022 | Czerwinski |
| 2022/0324066 A1 | 10/2022 | Argentine |
| 2022/0328202 A1 | 10/2022 | Venneri et al. |
| 2022/0328203 A1 | 10/2022 | Bass et al. |
| 2022/0328205 A1 | 10/2022 | Bass et al. |
| 2022/0336118 A1 | 10/2022 | Corbin et al. |
| 2022/0351870 A1 | 11/2022 | Fisher et al. |
| 2022/0363995 A1 | 11/2022 | Goodrich et al. |
| 2022/0375635 A9 | 11/2022 | LeBlanc |
| 2023/0024338 A1 | 1/2023 | Reed et al. |
| 2023/0096162 A1 | 3/2023 | Loewen et al. |
| 2023/0104365 A1 | 4/2023 | Eichel et al. |
| 2024/0190748 A1* | 6/2024 | Kim .................. C03B 7/08 |

FOREIGN PATENT DOCUMENTS

| | | |
|---|---|---|
| CN | 102937090 | 4/2015 |
| CN | 104862531 | 8/2015 |
| CN | 105060914 | 11/2015 |
| CN | 106425315 | 2/2017 |
| CN | 105334138 | 1/2018 |
| CN | 106180254 | 6/2018 |
| CN | 108151567 | 6/2018 |
| CN | 108172318 | 6/2018 |
| CN | 108389634 | 8/2018 |
| CN | 108511088 | 9/2018 |
| CN | 108520785 | 9/2018 |
| CN | 207850147 | 9/2018 |
| CN | 108624839 | 10/2018 |
| CN | 107034386 | 11/2018 |
| CN | 107130242 | 3/2019 |
| CN | 109509562 | 3/2019 |
| CN | 106840765 | 4/2019 |
| CN | 109671510 | 4/2019 |
| CN | 105976879 | 5/2019 |
| CN | 108198635 | 7/2019 |
| CN | 110042434 | 7/2019 |
| CN | 108206065 | 9/2019 |
| CN | 109022921 | 9/2019 |
| CN | 107469628 | 10/2019 |
| CN | 107945887 | 10/2019 |
| CN | 108389632 | 10/2019 |
| CN | 109234573 | 10/2019 |
| CN | 209496626 | 10/2019 |
| CN | 110783010 | 2/2020 |
| CN | 110842494 | 2/2020 |
| CN | 210039648 | 2/2020 |
| CN | 107238627 | 3/2020 |
| CN | 108167195 | 7/2020 |
| CN | 111508627 | 8/2020 |
| CN | 211742680 | 10/2020 |
| CN | 112111251 | 12/2020 |
| CN | 112284170 | 1/2021 |
| CN | 112322939 | 2/2021 |
| CN | 110549697 | 4/2021 |
| CN | 112609195 | 4/2021 |
| CN | 212934166 | 4/2021 |
| CN | 110444311 | 5/2021 |
| CN | 112778012 | 5/2021 |
| CN | 108417277 | 6/2021 |
| CN | 110695091 | 6/2021 |
| CN | 113202780 | 8/2021 |
| CN | 113369652 | 9/2021 |
| CN | 214529256 | 10/2021 |
| CN | 113630582 | 11/2021 |
| CN | 113658722 | 11/2021 |
| CN | 111334258 | 12/2021 |
| CN | 111421913 | 12/2021 |
| CN | 113744900 | 12/2021 |
| CN | 113851233 | 12/2021 |
| CN | 214998262 | 12/2021 |
| CN | 113936820 | 1/2022 |
| CN | 113990535 | 1/2022 |
| CN | 111627571 | 2/2022 |
| CN | 113061781 | 2/2022 |
| CN | 114074234 | 2/2022 |
| CN | 114093529 | 2/2022 |
| CN | 215770541 | 2/2022 |
| CN | 111057993 | 3/2022 |
| CN | 114774738 | 7/2022 |
| CN | 112228853 | 8/2022 |
| CN | 112259263 | 8/2022 |
| CN | 112530614 | 8/2022 |
| CN | 114917603 | 8/2022 |
| CN | 114927242 | 8/2022 |
| CN | 111627572 | 9/2022 |
| CN | 111945171 | 9/2022 |
| CN | 112174670 | 9/2022 |
| CN | 115050490 | 9/2022 |
| CN | 115076479 | 9/2022 |
| CN | 111739665 | 10/2022 |
| CN | 112992389 | 11/2022 |
| CN | 115351276 | 11/2022 |
| CN | 112587989 | 12/2022 |
| CN | 113241200 | 12/2022 |
| CN | 115436402 | 12/2022 |
| EP | 3563389 | 7/2021 |
| WO | WO2013077941 | 10/2013 |
| WO | WO2014039641 | 6/2014 |
| WO | WO2015017928 | 2/2015 |
| WO | WO2015094450 | 10/2015 |
| WO | WO2017032379 | 3/2017 |
| WO | WO2017059360 | 4/2017 |
| WO | WO2017192607 | 11/2017 |
| WO | WO2018009433 | 1/2018 |
| WO | WO2018013317 | 1/2018 |
| WO | WO20180311 | 2/2018 |
| WO | WO2017199059 | 2/2018 |
| WO | WO2018026429 | 3/2018 |
| WO | WO2018042216 | 4/2018 |
| WO | WO2018064572 | 4/2018 |
| WO | WO2018071081 | 5/2018 |
| WO | WO2018084940 | 6/2018 |
| WO | WO2018213669 | 1/2019 |
| WO | WO2019152595 | 8/2019 |

(56) References Cited

FOREIGN PATENT DOCUMENTS

| | | |
|---|---|---|
| WO | WO2019226218 | 1/2020 |
| WO | WO2019231971 | 1/2020 |
| WO | WO2020123513 | 8/2020 |
| WO | WO2021151055 | 7/2021 |
| WO | WO2021133952 | 9/2021 |
| WO | WO2022022792 | 2/2022 |
| WO | WO2022039795 | 2/2022 |
| WO | WO2022039893 | 2/2022 |
| WO | WO2022040116 | 3/2022 |
| WO | WO2022061195 | 4/2022 |
| WO | WO2022146446 | 7/2022 |

* cited by examiner

THERMAL EXPANSION SUPPORT SYSTEM AND METHODS OF USE THEREOF

TECHNICAL FIELD

This present disclosure relates generally to thermal expansion support systems and methods for decreasing stress in components subject to thermal stress, such as thermal stresses induced from fluids flowing therethrough.

BACKGROUND

Devices and components within a system, such as piping segments, reactors, heat exchangers, and other similar components, undergo thermal expansion as the temperature of such components rise. In some cases, the temperature of such components may rise as a result of a temperature differential between a fluid flowing through the component and the component itself. For example, as the temperature differential increases, the severity of the thermal expansion may also increase due to the transfer of thermal energy from the fluid to the fluid-containing component or pipe. The transfer of such thermal energy may, in turn, operate to cause a thermal expansion of the material that forms the pipe. In some cases, the pipe may be associated with, or otherwise connected to, and optionally structurally supported by, certain other devices, assemblies or systems, some of which may operate to fix the pipe in place.

Accordingly, the thermal expansion of the material of the pipe may, in such systems, cause undue stresses and strains in the material of the pipe as the expansion of the pipe is limited by such other devices, assemblies, and/or systems which structurally support the pipe in place. While certain conventional systems utilize expansion loops and other modifications to the fluid-carrying component itself, such conventional systems require excessive space and are bulky and ultimately unwieldy in many applications, such as within the context of piping for a nuclear reactor system. Such conventional systems also fail to account for dynamic changes to the thermal stress, such as may be experienced as a result of varying temperature differentials over time. Therefore, there is a long-felt and unresolved need for a system that can alleviate the stress caused by thermal expansion in a compact and responsive manner.

SUMMARY

In one aspect, a system including: a vessel; a first component coupled with the vessel and subject to thermal expansion during operation of the vessel; and a thermal expansion support system coupled with the first component and configured to counterbalance the first component and relieve stress therein induced by the thermal expansion.

In a second aspect, the system of the first aspect or any other aspect, wherein the thermal expansion support system includes a counterweight.

In a third aspect, the system of the second aspect or any other aspect, wherein the thermal expansion support system further includes: one or more pulleys; one or more cords; and one or more loop connection devices connected to the first component.

In a fourth aspect, the system of the third aspect or any other aspect, wherein the one or more cords are attached at a first end to the counterweight and pass through the one or more pulleys, and are attached at a second end to the one or more loop connection devices, wherein the counterweight counterbalances the thermal stress of the first component.

In a fifth aspect, the system of the fourth aspect or any other aspect, wherein the one or more pulleys includes ten pulleys, the one or more cords includes four cords, and the one or more loop connection devices includes four loop connection devices.

In a sixth aspect, the system of the fifth aspect or any other aspect, wherein the first component moves from a first position to a second position as the system increases from a first temperature to a second temperature.

In a seventh aspect, the system of the sixth aspect or any other aspect, wherein the counterweight remains separated from a ground while the first component is in the second position.

In an eighth aspect, the system of the first aspect or any other aspect, further comprising: a structural support system; and a second component; and wherein the vessel, first component, and second component are in fluid connection with a plurality of piping segments, defining a fluid loop.

In a ninth aspect, the system of the eighth aspect or any other aspect, wherein the thermal expansion support system includes at least one actuator to counterbalance the thermal stress of the first component.

In a tenth aspect, the system of the ninth aspect or any other aspect, further including: at least one thermocouple inside the vessel or first component; and a processing unit; wherein the processing unit is operatively connected to the at least one thermocouple and the at least one actuator.

In an eleventh aspect, the system of the tenth aspect or any other aspect, wherein the processing unit receives temperature readings from the at least one thermocouple, and based on the temperature readings, transmits a communication to the at least one actuator to provide a counterbalancing force on the fluid loop to decrease stress caused by thermal expansion.

In a twelfth aspect, the system of the eleventh aspect or any other aspect, wherein the temperature readings received by the processing unit from the at least one thermocouple indicates an increase in temperature within the fluid loop, and the processing unit causes the at least one actuator to increase the counterbalancing force on the fluid loop.

In a thirteenth aspect, the system of the twelfth aspect or any other aspect, wherein the increased counterbalancing force provided by the at least one actuator upon the increase in temperature within the fluid loop causes the first component to move from a first position to a second position.

In a fourteenth aspect, the system of the eleventh aspect or any other aspect, wherein the temperature readings received by the processing unit from the at least one thermocouple indicates a decrease in temperature within the fluid loop, and the processing unit causes the at least one actuator to decrease the counterbalancing force on the fluid loop.

In a fifteenth aspect, the system of the fourteenth aspect or any other aspect, wherein the decreased counterbalancing force provided by the at least one actuator upon the decrease in temperature within the fluid loop causes the first component to move from a first position to a second position.

In a sixteenth aspect, the system of the thirteenth aspect or any other aspect, wherein the at least one actuator is in contact with at least one of a piping segment of the plurality of piping segments or the first component, and wherein the at least one actuator actuates to move the first component from the first position to the second position.

In a seventeenth aspect, the system of the thirteenth aspect or any other aspect, wherein the thermal expansion support system further includes: a plurality of pulleys connected to the structural support system; one or more loop connection devices, wherein the one or more loop connection devices are connected to the first component; and one or more cords, wherein the one or more cords are attached at a first end to the at least one actuator and pass through the plurality of pulleys, and are attached at a second end to the one or more loop connection devices; wherein the at least one actuator is extended when the first component is in the first position.

In an eighteenth aspect, the system of the seventeenth aspect or any other aspect, wherein the at least one actuator retracts to move the first component from the first position to the second position.

In a nineteenth aspect, a method for relieving stress in a high temperature system caused by thermal expansion, including: measuring a temperature of a material within the high temperature system, wherein the high temperature system includes: a first component; and a second component, wherein the first component and second component are in fluid connection with a plurality of piping segments; sending the temperature measurement to a control device; determining a counterbalancing force to be applied onto the high temperature system based on the temperature measurement; sending a signal to one or more actuators indicating the determined counterbalancing force to apply to the high temperature system; and applying the determined counterbalancing force to at least one support point on the high temperature system by the one or more actuators.

In a twentieth aspect, the method of the nineteenth aspect or any other aspect, further including: causing the first component to move from a first position to a second position upon applying the determined counterbalancing force to the at least one support point.

In a twenty-first aspect, the method of the twentieth aspect or any other aspect, wherein the one or more actuators are retracted when the first component is in the first position.

In a twenty-second aspect, the method of the twenty-first aspect or any other aspect, wherein the one or more actuators extend to apply the determined counterbalancing force to the at least one support point to move the first component from the first position to the second position.

In a twenty-third aspect, the method of the twenty-second aspect or any other aspect, wherein the at least one support point includes at least one of a piping segments segment of the plurality of piping segments and the first component.

In a twenty-fourth aspect, the method of the twenty-third aspect or any other aspect, wherein the first component is a heat exchanger and the second component is a vessel.

In a twenty-fifth aspect, the method of the twentieth aspect or any other aspect, wherein one or more cords are connected at a first end to the one or more actuators, pass through one or more pulleys, and are connected at a second end to one or more loop connection devices that are connected to the at least one support point, wherein the one or more actuators applies the determined counterbalancing force on the at least one support point by contracting and pulling the heat exchanger from the first position to the second position.

In a twenty-sixth aspect, the method of the twenty-fifth aspect or any other aspect, wherein the at least one support point includes at least one of a piping segment of the plurality of piping segments and the first component.

In a twenty-seventh aspect, the method of the twenty-sixth aspect or any other aspect, wherein the first component is a heat exchanger and the second component is a vessel.

In a twenty-eight aspect, a method for operating a thermal expansion support system, including: circulating a fluid through a loop defined by a plurality of piping segments, the plurality of piping segments movably coupled to a support structure; causing a temperature of the fluid to increase such that the plurality of piping segments expand from a first configuration to a second configuration due to thermal expansion; and controlling a movement of the plurality of piping segments from the first configuration to a second configuration using a counterweight.

In a twenty-ninth aspect, the method of the twenty-eighth aspect or any other aspect, wherein the controlling includes guiding the plurality of piping segments from the first configuration to second configuration using a cord attached at a first end to the piping segments and a second end to the counterweight.

In a thirtieth aspect, the method of the twenty-ninth aspect or any other aspect, wherein the cord is routed between the piping segments and counterweight by a pulley.

BRIEF DESCRIPTION OF THE DRAWINGS

The accompanying drawings illustrate one or more embodiments and/or aspects of the disclosure and, together with the written description, serve to explain the principles of the disclosure. Wherever possible, the same reference numbers are used throughout the drawings to refer to the same or like elements of an embodiment, and wherein.

Figure 1:
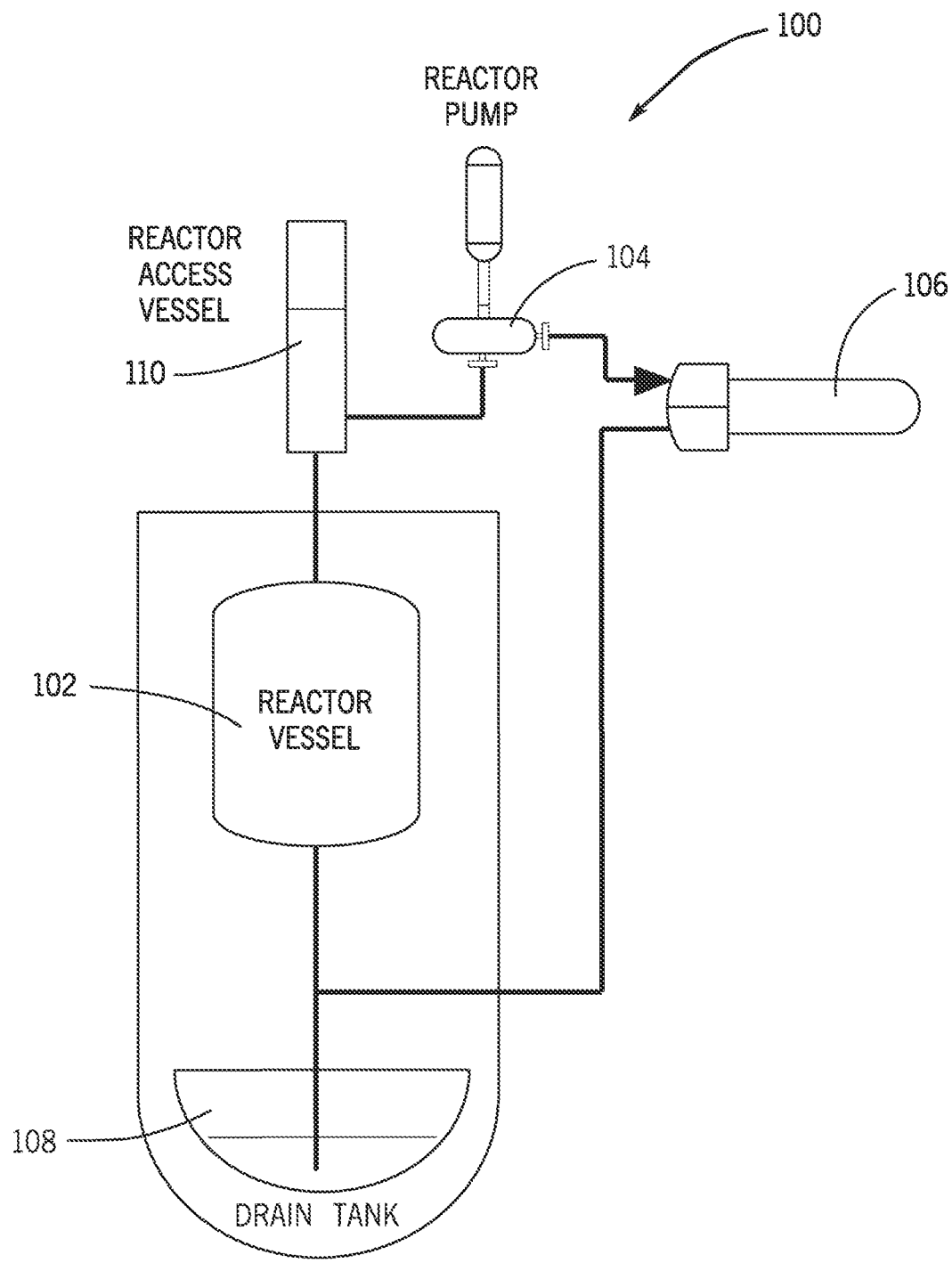
FIG. 1 illustrates an example molten salt reactor system, according to one embodiment of the present disclosure.

The use of cross-hatching or shading in the accompanying figures is generally provided to clarify the boundaries between adjacent elements and also to facilitate legibility of the figures. Accordingly, neither the presence nor the absence of cross-hatching or shading conveys or indicates any preference or requirement for particular materials, material properties, element proportions, element dimensions, commonalities of similarly illustrated elements, or any other characteristic, attribute, or property for any element illustrated in the accompanying figures.

Additionally, it should be understood that the proportions and dimensions (either relative or absolute) of the various features and elements (and collections and groupings thereof) and the boundaries, separations, and positional relationships presented therebetween, are provided in the accompanying figures merely to facilitate an understanding of the various embodiments described herein and, accordingly, may not necessarily be presented or illustrated to scale, and are not intended to indicate any preference or requirement for an illustrated embodiment to the exclusion of embodiments described with reference thereto.

DETAILED DESCRIPTION

The description that follows includes sample systems, methods, and apparatuses that embody various elements of the present disclosure. However, it should be understood that the described disclosure may be practiced in a variety of forms in addition to those described herein.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

In multiple embodiments, the system may include piping segments, one or more thermal components, and other components (e.g., piping segment connectors, etc.) in fluid connection, with material (such as molten salt, high pressure water, or other fluids) flowing through the system at a temperature that is elevated from the temperature of the component. In some cases, the temperature of fluid may be greatly elevated, such as having a temperature of at least 100° C., of at least 400° C., of at least 800° C., and so on. In many embodiments, as the temperature of the material increases, via a heat exchanger or fuel source (e.g., nuclear reactor, etc.), the temperature of the piping segments and components within the high temperature system also increase. As a result of the temperature increase, the piping segments and components may undergo thermal expansion. Particularly where such piping is structurally supported by, or otherwise connected to, other, potentially fixed or rigid components, the thermal expansion of the piping may be impeded or prevented. Absent the ability to properly expand, such piping may be subject to stresses that can ultimately lead to failure.

Stresses induced in the piping and other thermal components may be compounded as the size (and weight) of such components increase. For example, as the size and weight of such components increase, so, too, do the components used to structurally support them. Further, piping segments may come into and out of these large-sized components, which may also be subject to the effects of the thermal expansion. With conventional systems, piping segments and components within a high temperature system are attached to conventional support structures, such as being hung from a chain or supported by a sliding shoe, in a way that allows for thermal expansion along a single line (e.g., expands in one direction). Other conventional systems may include expansion loops, which are bends in the piping segments that absorb the thermal expansion within the system. However, these conventional systems require a more voluminous space to include the conventional structures and expansion loops, and cannot be implemented in certain high temperature systems that do not have the requisite amount of space to include these conventional support structures and expansion loops within the system. Such conventional systems may also fail to dynamically account for changes in the thermal stresses, such as that which be induced due to rapid changes in the temperatures in the system. Additionally, by not being allowed to move, or having very little ability to move in more than one direction, the piping segments and components are at a greater risk of failing due to high stress caused by thermal expansion at extreme temperatures.

To mitigate these and other challenges, disclosed herein includes examples of high temperature systems that include exemplary thermal expansion support systems that decrease the stress within the one or more components caused by thermal expansion by allowing such component to expand while continuing to structurally support such component in the system. The example thermal expansion support systems disclosed herein may provide a counterbalancing force on the components and piping segments of the high temperature system. The counterbalancing force provided by the exemplary thermal expansion support systems allow the components and/or piping segments a set range of motion during thermal expansion in order to reduce stress caused by the thermal energy of the fluid while maintain the component structurally supported in the system. In one or more embodiments, the thermal expansion support system may be utilized on components and/or piping components of a high temperature system that are more susceptible to high stresses caused by thermal expansion, and thus, more likely to fail due to thermal expansion stress. In many embodiments, the components or piping connected to the thermal expansion support system are not rigidly attached to the support structure of the loop. In certain embodiments, the components or piping segments attached to an exemplary thermal expansion support system (or fluidly connected to components connected to the support system) are able to move in any direction from an initial starting point to lessen the effects of thermal expansion, while receiving structural support from the thermal expansion support system.

In at least one embodiment, the freedom of movement may be caused by a thermal expansion support system that utilizes a counterweight system so that the components and piping hang down from pulleys and can move in any direction. In another embodiment, an exemplary thermal expansion support system may decrease the effects of thermal expansion by utilizing active system components, such as actuators, hydraulics, electric motors, or other similar devices to put a counterbalancing force on the certain susceptible components or piping segments, wherein the counterbalancing force is applied dynamically changing as the temperature of the high temperature system increases or decreases.

Referring now to the figures, for the purposes of example and explanation of the fundamental processes and components of the disclosed systems and methods, reference is made to FIG. 1, which illustrates an example, schematic overview of one embodiment of a molten salt reactor system 100. The molten salt reactor system 100 is an example of a high temperature system that may utilize an exemplary thermal expansion support system, as described in greater detail below. As will be understood and appreciated, the example, schematic overview shown in FIG. 1 represents merely one high temperature environment in which an exemplary thermal expansion support system may be utilized. It will be understood that the thermal expansion support systems as described herein may be used in and with substantially any other nuclear reactor system, such as those associated with high temperatures and/or high pressures, among other characteristics, substantially analogous to those associated the molten salt reactor system 100 described herein.

In various embodiments, the molten salt reactor system 100 may utilize fuel salt enriched with uranium (e.g., high-assay low-enriched uranium) to create thermal power via nuclear fission reactions. In at least one embodiment, the composition of the fuel salt may be LiF-BeF2-UF4, though other compositions of fuel salts may be utilized as fuel salts within the reactor system 100. The fuel salt within the system 100 is heated to high temperatures (about 700° C.) and the fuel salt melts as the system 100 is heated. In several embodiments, the molten salt reactor system 100 includes a reactor vessel 102 where the nuclear reactions occur within the molten fuel salt, a fuel salt pump 104 that pumps the molten fuel salt to a heat exchanger 106, such that the molten fuel salt re-enters the reactor vessel after flowing through the heat exchanger, and piping segments in between each component. The molten salt reactor system 100 may also include additional components, such as, but not limited to, drain tank 108 and reactor access vessel 110). The drain tank 108 may be configured to store the fuel salt once the fuel salt is in the reactor system 100 but in a subcritical state, and also acts as storage for the fuel salt if power is lost in the system 100. The reactor access vessel 110 may be configured to allow for introduction of uranium fluoride (UF4) and/or Beryllium (Be) to the system 100 as necessary to bring the reactor to a critical state, compensate for depletion of fissile material and/or manage fuel salt chemistry. The reactor access vessel 110 may also be configured to remove salt samples or coupons from the system. It should be understood that the systems and methods described below may be used with the molten salt reactor system 100, as well as other suitable types of reactors. In at least one embodiment, the thermal expansion support system may be connected to any of the components and/or piping segments of the system 100.

Turning to FIGS. 2-10, various views of a high temperature fluid loop 202 with a thermal expansion support system 214 are shown, according to one embodiment of the present disclosure. In multiple embodiments, the high temperature loop 202 may be the molten salt reactor system 100, but may also be any other high temperature system with components that undergo thermal expansion, such as a molten salt system with no nuclear reactions. The high temperature loop 202 may include a first component 204, a second component 206, a third component 208, a plurality of piping segments that connect the first component 204, the second component 206, and the third component 208 together, a support structure 212 and the thermal expansion support system 214. In many embodiments, the high temperature loop 202 may have a high temperature fluid flowing through the loop, such as molten salt, highly-pressurized water or water vapor, or any other material that may be found in high temperature systems. In one or more embodiments, the component 204, component 206, and component 208 are fluidly connected via the piping segments 210. As shown in FIGS. 2-10, component 204 is connected to the thermal support system 214, the component 206 is rigidly attached to the support structure 212, and component 208 is attached to the bottom of and is hanging from component 206; however, in other embodiments, none or a different combination of the components of the high temperature loop 202 may be rigidly attached to the support structure 212. In one or more embodiments, the support structure 212 is made of various supporting structures such as beams and beam connectors.

In several embodiments, second component 206 may be a vessel (e.g., reactor vessel 102) that causes the material within the loop to increase in temperature, or any other component utilized in a high temperature system (e.g., a heat exchanger, pump, etc.). In many embodiments, the third component 208 may be a variety of components, such as a heat exchanger, drain tank (e.g., drain tank 108), pump (e.g., reactor pump 104), vessel (e.g., reactor access vessel 110) or some other component utilized in a high temperature loop system. In at least one embodiment, the first component 204 may be a heat exchanger (e.g., heat exchanger 106), pump (e.g., pump 104), radiator, access vessel (e.g., reactor access vessel 110), or any other component that may be utilized on the loop 202. In one or more embodiments, the piping segments 210 may allow for the material within the loop 202 to flow from one component to the next. In some embodiments, the components 206, 208, and 204, and piping segments 210, may be made of heat resistant material, such as stainless steel or other similar materials that can resist extreme internal temperatures (e.g., 700° C. or more). In many embodiments, the components 206, 208, and 204, and piping segments 210 may undergo thermal expansion as the material within the loop 202 is heated up from ambient temperatures to extremely high temperatures, which may cause severe stress due to thermal expansion on the loop 202. In some embodiments, the thermal expansion may cause such severe stress on the loop 202, that if the loop 202 was rigidly mounted to the support structure 212, the stress on the loop 202 would cause the loop 202 to break (e.g., the connection points of the pipes 210, bends in the pipes 210, etc.).

In several embodiments, the thermal expansion support system 214 may utilize the application of a counterbalancing force on at least one component and/or piping segments to decrease stress on the loop 202 due to thermal expansion. In many embodiments, the thermal expansion support system 214 may include a counterweight 216, one or more cords 218 having a first end and a second end, one or more pulleys 220, 222, and 224, and one or more loop connection devices 226. In various embodiments, the one or more cords 218 are connected at the first end to the counterweight 216, and the second end of the one or more cords 218 are passed through the one or more pulleys 220, 222, and 224, and connected to the one or more loop connection devices 226, which are connected to the component 204. As the component 204 and/or piping segments 210 of the loop 202 moves or expands due to the thermal expansion, the component 204 and/or piping segments 210 may move freely in any direction while the attached counterweight 216 provides the counterbalancing force on the loop 202 via the component 204.

Figure 2:
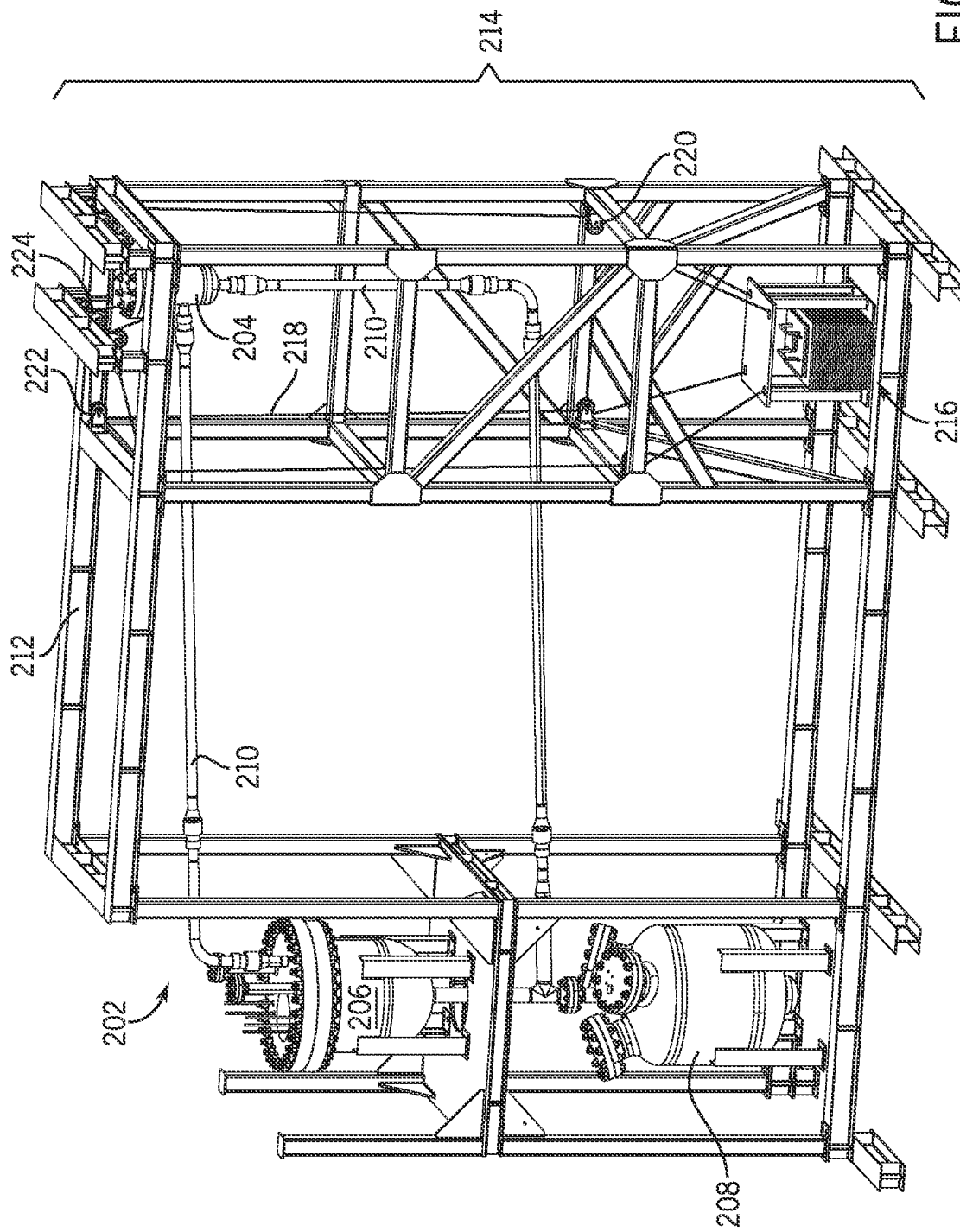
FIG. 2 illustrates a perspective view of an example system with an example thermal expansion support system, according to one embodiment of the present disclosure.
Figure 3:
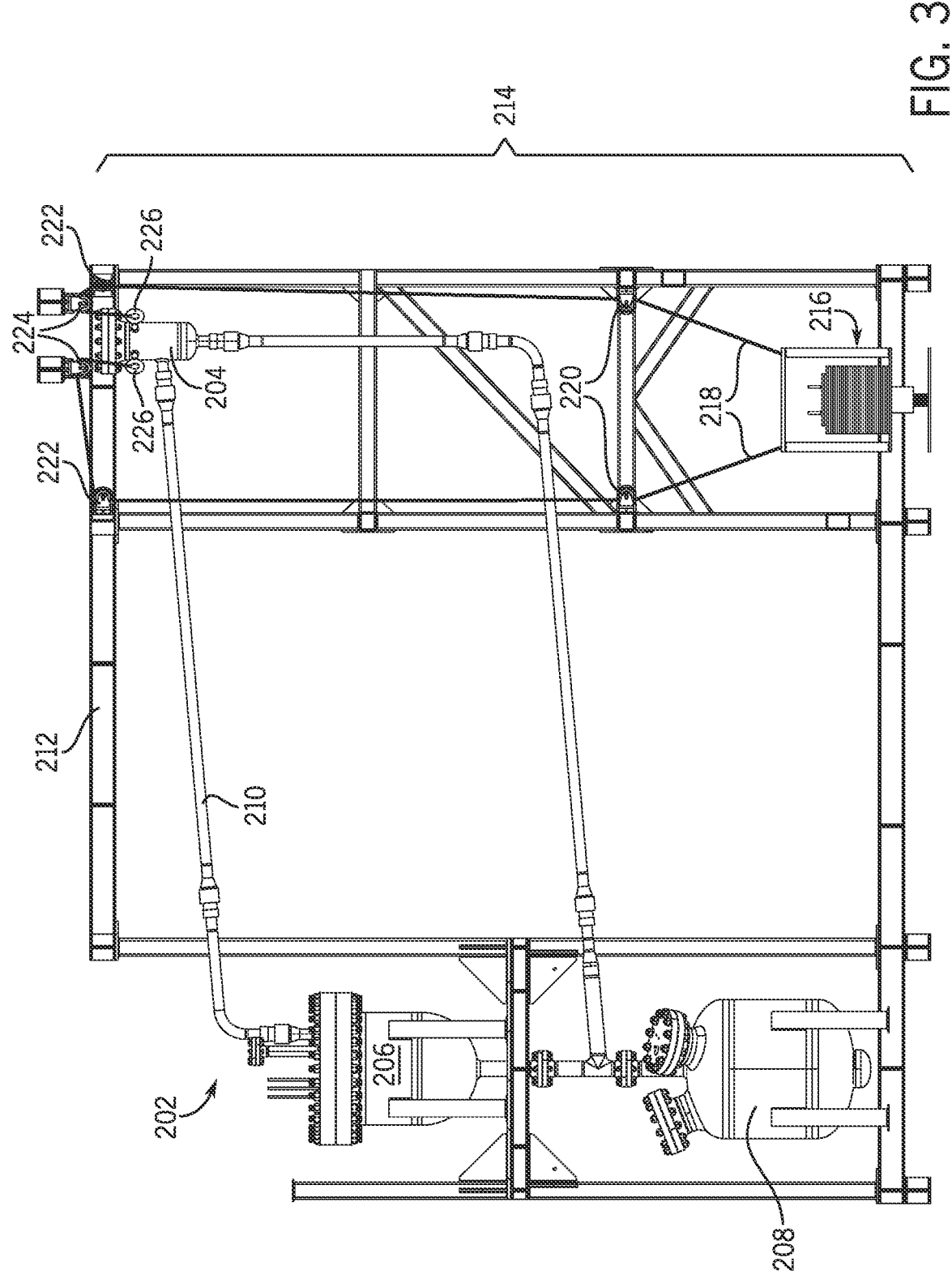
FIG. 3 illustrates a side view of the example system of FIG. 2.

In various embodiments, the counterweight 216 is generally located underneath component 204 to account for vertical and horizontal expansion of the piping segments 210 and/or component 204. In at least one embodiment, the counterweight 216 may have a weight that is generally proportional to the weight of the loop 202 or of an opposing portion of the loop 202. For example, as shown in FIG. 2, the counterweight 216 may have a weight that is generally the same as the weight of the components 206 and 208, the various piping segments 210 and support structure 212 that is supporting the components 206 and 208. In many embodiments, the counterweight 216, and components thereof, may be any shape depending on the needs of the loop, and in a preferred embodiment, has a square or rectangular-shaped horizontal cross-section. In various embodiments, the counterweight 216 may be composed of a material that can withstand extreme radiating temperatures from the loop 202, such as stainless steel and other similar materials.

Figure 4:
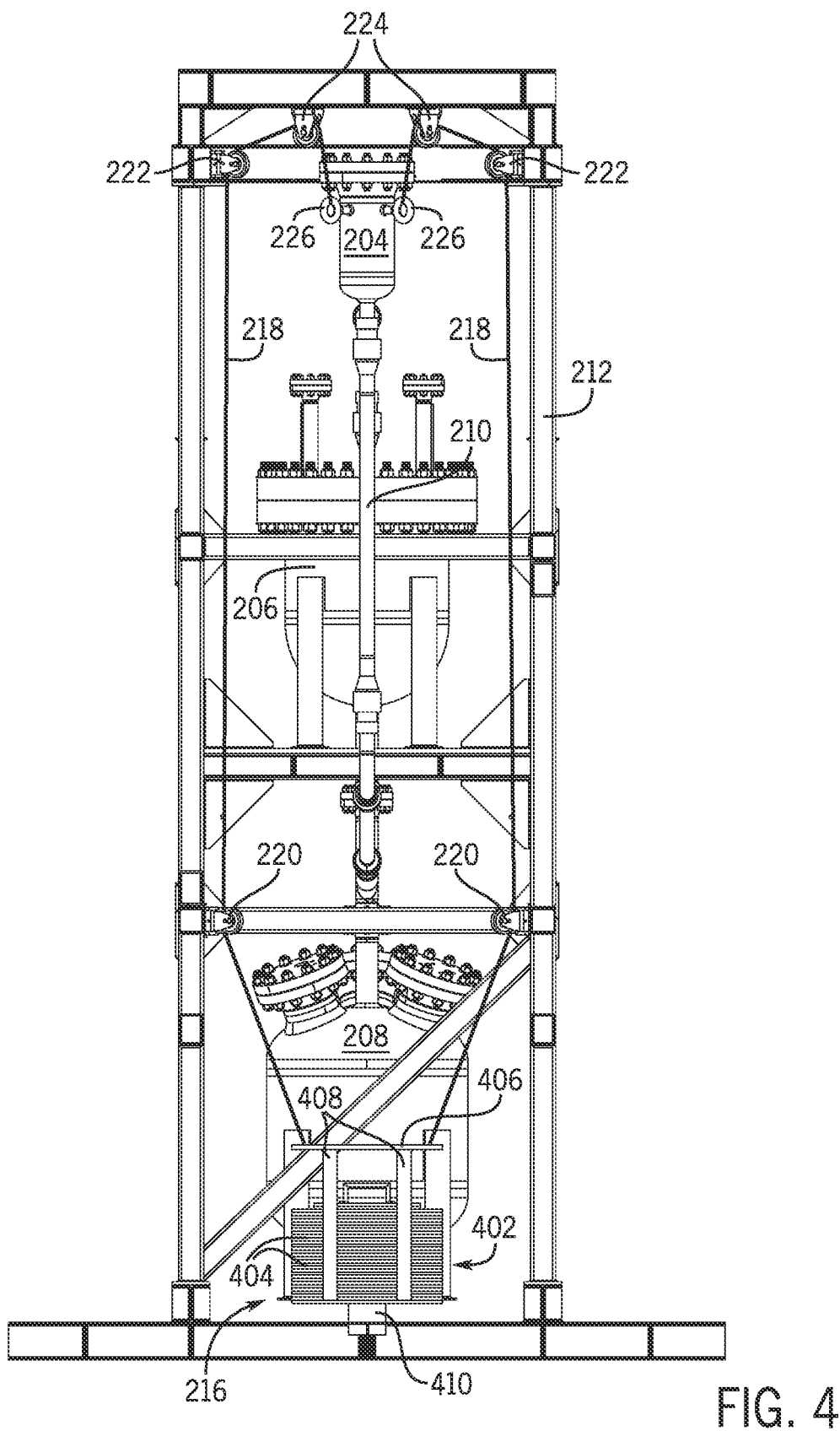
FIG. 4 illustrates a side view of the example system of FIG. 2.
Figure 5:
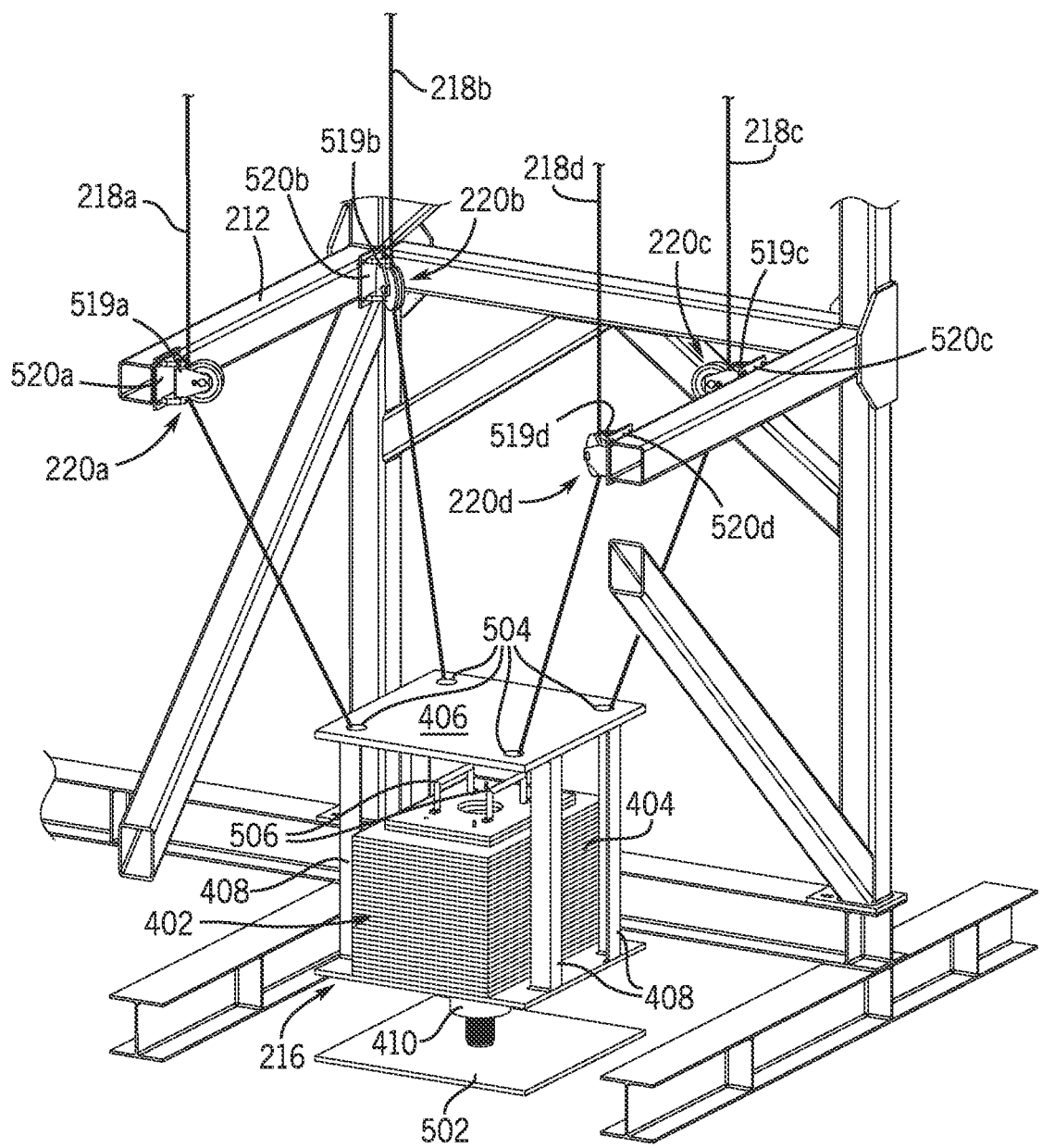
FIG. 5 illustrates a perspective view of the example system of FIG. 2.

As more specifically shown in FIGS. 4 and 5, in some embodiments, the counterweight 216 may include a weight 402. In several embodiments, the weight 402 may be a single weight, or may be formed by a plurality of individual plates 404. The counterweight 216 may also include an attachment plate 406, and the attachment plate may define one or more openings 504 that extend through the attachment plate 406. In one or more embodiments, the one or more openings 504 defined within with attachment plate 406 may allow for a cord 218a, 218b, 218c, or 218d (as shown in FIG. 5 and further described herein) to attach to the attachment plate 406 via fasteners (e.g., D-rings, carabiner locks, etc.) (fasteners not shown in the figures).

In many embodiments, the counterweight may also include a counterweight base 410. The counterweight base 410 is connected to the attachment plate 406 by one or more attachment rods 408. In several embodiments, the attachment plate 406 may be connected to the one or more attachment rods 408 by screwing on (e.g., the first end of the attachment rod 408 is threaded and the bottom surface of the attachment plate 406 is also threaded to accept the first end of the attachment rod 408). In other embodiments, the attachment plate 406 may be removably coupled via bolts to the one or more attachment rods 408. In yet other embodiments, the attachment plate 406 may be welded onto the attachment rod 408. In many embodiments, the weight 402 may be positioned on the counterweight base 410, in between the attachment plate 406 and the counterweight base 410. In one embodiment, one or more handles 506 may be attached to the weight 402 to assist in moving the weight 402. In certain embodiments, individual weights 404 may be added or removed from the counterweight 216, depending on the need, weight, and/or size of the loop 202. In some embodiments, the attachment plate 406 may be removed from the attachment rod 408 so that individual plates 404 may be removed from or added to the counterweight 216.

In several embodiments, the counterweight 216 may be loosely connected to a base plate 502. The base plate 502 is positioned on the same surface as the structural supports 212 (e.g., a floor or ground), and may include a guide that prevents the counterweight 216 from swaying as the loop 202 expands and moves while undergoing thermal expansion. However, once the thermal expansion support system 214 is connected to the loop 202, the counterweight 216 remains separated from the ground and base plate 502 while the system 214 is in operation and the component 204 and/or piping segments 210 move and change configurations (e.g., the weight of the counterweight is not placed on the base plate 502).

In another embodiment, the system 214 may instead include a plurality of individual counterweights (e.g., a plurality of counterweights 216), wherein each individual counterweight is not attached or connected to any other individual counterweight. In this embodiment, each individual counterweight may be attached to a cord (e.g., cord 218a, 218b, 218c, or 218d) that goes around one or more pulleys 220, 222, 224 and is connected to a loop connection device (e.g., loop connection device 226a, 226b, 226c, or 226d as described herein). Continuing with this embodiment, the individual counterweights may each weigh the approximately the same, or each individual counterweight may be weighted differently, depending on the needs of the system 214 and loop 202.

In various embodiments, the system 214 also includes the one or more cords 218. As shown in FIGS. 2-10, the one or more cords 218 may include four cords 218a, 218b, 218c, and 218d, though it will be appreciated that the system 214 may use more or less cords depending on the needs of the system 214. In at least one embodiment, the one or more cords 218 may be made of a material that can withstand heat, as the one or more cords 218 are attached to the component 204, via the one or more loop connection devices 226, which is radiating the heat of the loop 202. For example, the one or more cords 218 may be made of stainless steel, nickel, or other similar heat-resistant materials, which can withstand heat of at least 300° C., of at least 600° C., of at least 1000° C., etc. In at least one embodiment, the one or more cords 218 may have an attachment device or fastener on each of the first and second ends for connecting the one or more cords 218 to the counterweight 216 at the first end and the one or more loop connection devices 226 at the second end. In at least one embodiment, each of the one or more cords 218 also passes through the one or more pulleys 220, 222, and 224 before connecting to the one or more loop connection devices 226. In another embodiment, each of the one or more cords 218 may loop through the one or more loop connection devices 226 and double-back around the one or more pulleys 220, 222, and 224, and the second end of the loop may attach to a connection point on the support structure 212 below the loop component 204 or the counterweight 216. In many embodiments, the one or more cords 218 may have a tensile strength that is sufficient so that the one or more cords 218 will not break when the system 214 is being utilized. In some embodiments, depending on the orientation of the counterweight 216 and the one or more loop connection devices 226, the one or more cords 218 may be different lengths.

Figure 6:
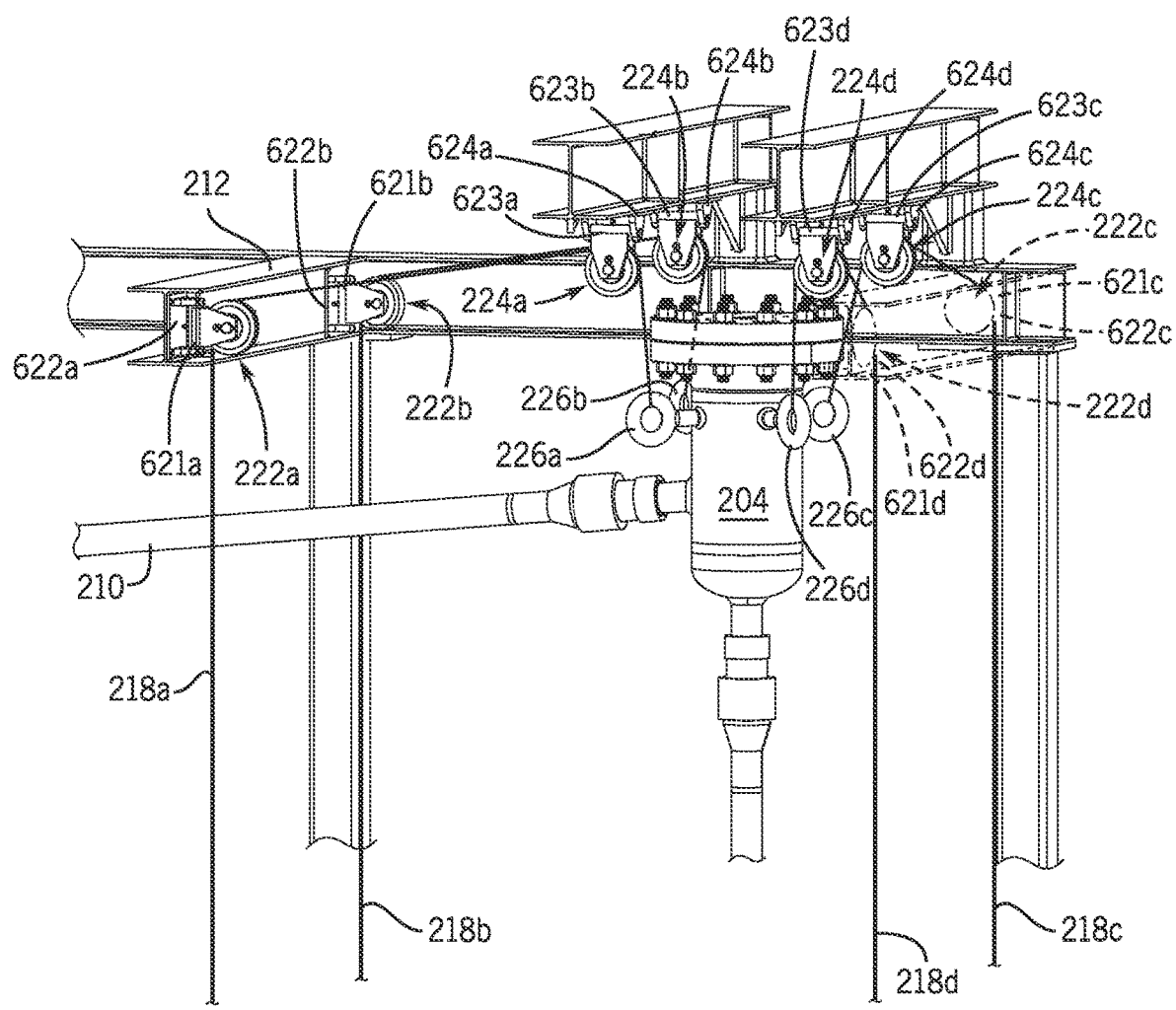
FIG. 6 illustrates a perspective view of the example system of FIG. 2.
Figure 7:
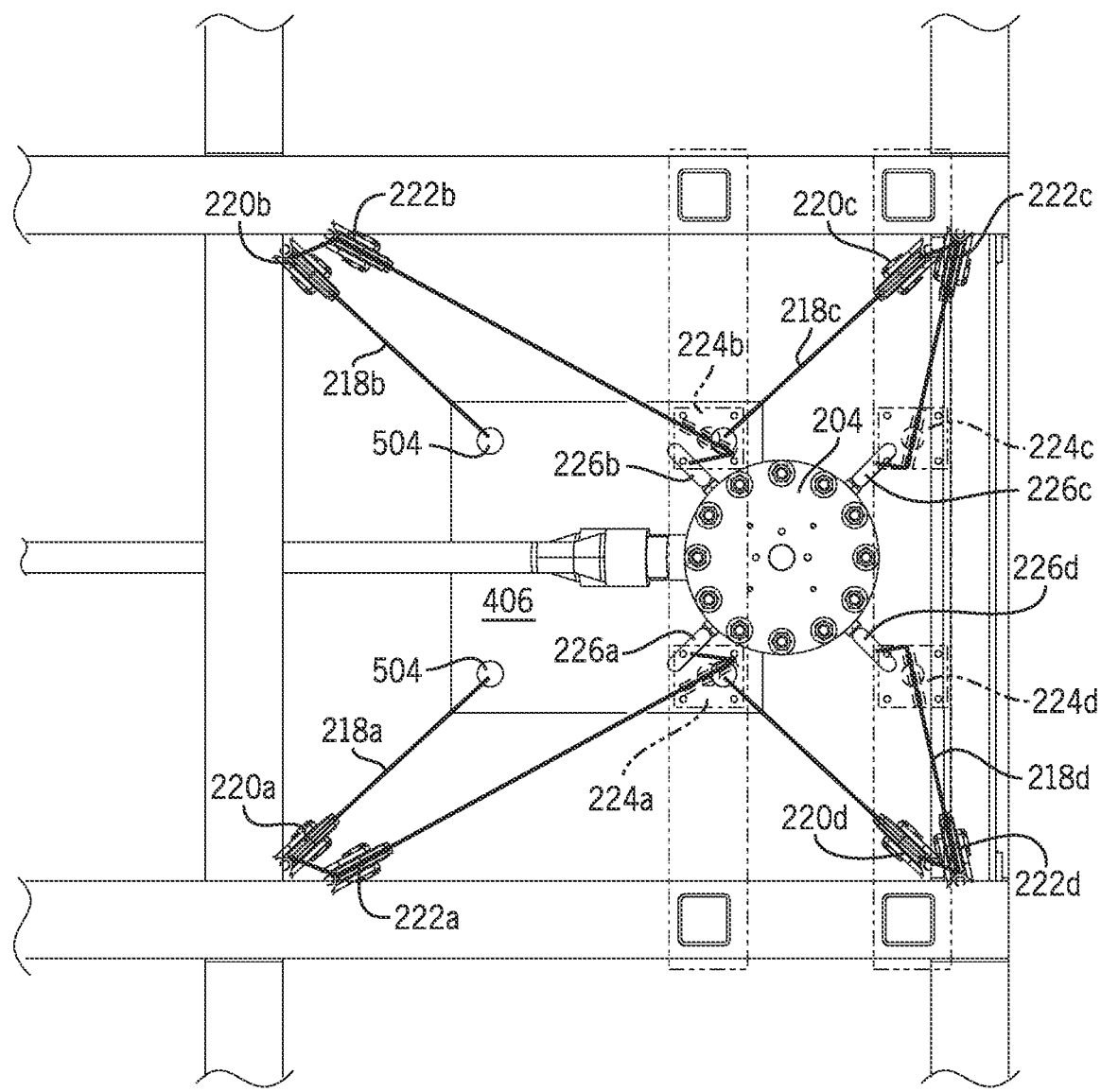
FIG. 7 illustrates a top view of the example system of FIG. 2.

The system 214 also includes the one or more pulleys 220, 222, and 224. As shown in FIG. 7, the one or more pulleys 220 may include pulleys 220a, 220b, 220c, and 220d, the one or more pulleys 222 may include pulleys 222a, 222b, 222c, and 222d, and the one or more pulleys 224 may include pulleys 224a, 224b, 224c, and 224d. In several embodiments, the one or more pulleys 220, 222, and 224 may be attached to the support structures 212. In one or more embodiments, the one or more pulleys 220, 222, and 224 may be attached at different heights on the support structure 212 to provide additional stability to the system 214. In at least one embodiment, at least the one or more pulleys 224 may be attached to a portion of the support structure 212 located above any component (e.g., component 204) or piping segments 210 on which the one or more loop connection devices 226 are attached, so that the components and/or piping segments can expand and move vertically while undergoing thermal expansion. As shown in FIG. 6, the one or more pulleys 224 are located above component 204, though it will be appreciated that any configuration of the structural support 212, and thus any positioning of the one or more pulleys 224, are within the scope of this disclosure (e.g., the portions of the structural support 212 that the one or more pulleys 224 are connected to may be positioned further apart or closer together both in horizontal and vertical directions above the component 204). In many embodiments, the one or more pulleys 220, 222, and 224 may be made of a heat resistant material, such as stainless steel, so that the heat radiating from the loop does not cause any of the one or more pulleys 220, 222, and 224 to fail. In at least one embodiment, the one or more pulleys 220, 222, and 224 may be arranged around the one or more loop connection devices 226 such that the component 204 has a free range of motion in all directions. In some embodiments, the amount of one or more pulleys 220, 222, and 224 utilized in the system 214 may depend on the needs of the loop 202, and may include as many pulleys as necessary to sufficiently support the system 214. In one or more embodiments, the system 214 is able to support movement of the loop in the horizontal plane and in the vertical plane due to the location of the one or more pulleys 220, 222, and 224. In one alternate embodiment, the system 214 may only utilize the one or more pulleys 222 and 224, or more or less pulleys, depending on the needs of the loop 202 and system 214.

In multiple embodiments, each of the pulleys 220a-d, 222a-d, and 224a-d may include a rotational piece attached to a baseplate, wherein the base plate is connected to the support structure 212 via welding or fasteners (e.g., bolts, etc.). Each of the pulleys 220a-d, 222a-d, and 224a-d allow for a cord 218 (as seen on FIG. 3) to be attached to the counterweight 216, pulled through the rotational pieces of the pulleys 220a-d, 222a-d, and 224a-d, and connected to the one or more loop connection devices 226. Each of the pulleys 220a-d, 222a-d, and 224a-d may also include an axle such that the pulleys 220a-d, 222a-d, and 224a-d may rotate about an x- or y-axis, depending on how the pulleys 220a-d, 222a-d, and 224a-d are mounted upon the support structure 212. Thus, as the component 204 moves due to thermal expansion, the axles allow the pulleys 220a-d, 222a-d, and 224a-d to rotate so that the counterweight 216 continues to structurally support the component 204, and the component 204 has a free range of motion in between the one or more pulleys 220, 222, and 224.

In multiple embodiments, the system 214 also includes the one or more loop connection devices 226 that are attached or connected to the component 204. In some embodiments, the component or components the one or more loop connection devices 226 are attached to are points along the loop 202 that may experience stress during thermal expansion, and these high stress components may be generally on the opposite side the loop 202 from structures and components within the loop 202 that are able to be more rigidly secured on support structures or the ground. Instead of rigidly attaching these high stress components to the support structures (e.g., via beams, etc.), which would exacerbate the thermal expansion stress issues, the system 214 may be used as support for these high stress components.

As shown in FIGS. 3, 4, and 6-10, the one or more loop connection devices 226 are attached to the component 204. In at least one embodiment, the one or more loop connection devices 226 may be made of stainless steel or other such material so that the one or more loop connection devices 226 can operate under the extreme heat of the loop 202. In many embodiments, the one or more loop connection devices 226 may be welded onto the component 204, or may be attached by fasteners such as a bolt, screw, or other similar fastener. In many embodiments, the one or more loop connection devices 226 may be attached to the component 204 such that the counterbalancing force provided by the counterweight 216 is spread generally evenly across the one or more loop connection devices 226, and ultimately, the component 204. For example, in one embodiment, as shown in FIG. 7, component 204 has four loop connection devices 226a, 226b, 226c, and 226d attached around the circumference of component 204 in about 90° increments, though the thermal support system 214 may include any number of one or more loop connection devices 226. In an alternative embodiment, the system 214 may include only one loop connection device 226, which may be attached on the top of and middle part of the component 204.

In various embodiments, the one or more loop connection devices 226 may be eye bolts, or a similar connector that allows the one or more cords 218 to attach to the one or more loop connection devices 226 (e.g., via carabiner lock, D-ring, etc.) or so that the one or more cords 218 can loop through the one or more loop connection device 226 and go back to the one or more pulleys 220, 222, and 224. In some embodiments, the one or more loop connection devices 226 may include a support plate that is welded or otherwise attached to the loop component 204 to increase the surface area of the attachment of each of the one or more loop connection devices 226 to the loop component 204.

In a preferred embodiment, as shown in FIG. 2-10, the system 214 includes twelve total pulleys-four pulleys 220a-d, four pulleys 222a-d, and four pulleys 224a-d. In the preferred embodiment, the cord 218a is attached to the counterweight 216, passed through pulleys 220a, 222a, and 224a, and connected to the loop connection device 226a. Similarly, the cord 218b is attached to the counterweight 216, passed through pulleys 220b, 222b, and 224b, and connected to the loop connection device 226b, the cord 218c is attached to the counterweight 216, passed through pulleys 220c, 222c, and 224c, and connected to the loop connection device 226c, and the cord 218d is attached to the counterweight 216, passed through pulleys 220d, 222d, and 224d, and connected to the loop connection device 226d. In the preferred embodiment, the pulleys 220a-d are placed below the component 204 at about the height of the counterweight 216, on support structure 212, so that each cord 218a-d is at an angle when attached to the counterweight and passed through the pulleys 220a-d. In the preferred embodiment, each cord 218a-d then is put through pulleys 222a-d, which are connected to the support structure 212 at or above the component 204 (or at or above the one or more loop connection devices 226). In the preferred embodiment, the pulleys 224a-d are attached to the support structure 212 directly over the component 204 or loop connection devices 226. Still in the preferred embodiment, each cord 218a-d is run through a pulley 224a-d and down to a loop connection device 226a-d. In the preferred embodiment, each cord 218a-d interacts with one pulley from each group so that no cords 218 cross over each other. For example, a cord 218 may run through or interact with pulley 220a, 222a, and 224a so that any horizontal stress on the cord or pulleys is decreased. However, it will be understood that more or less pulleys 220, 222, and/or 224, cords 218, loop connection devices 226, or different orientations of any of the foregoing may be used in the system 214 without deviating from the present disclosure. For example, in the embodiments as shown in FIGS. 11A-C, the system 214 operates in the same manner as described above, except that the system 214 does not include pulleys 222c-d, with cord 218c passing through pulleys 220c and 224 c, and cord 218d passing through 220d and 224d.

Figure 8:
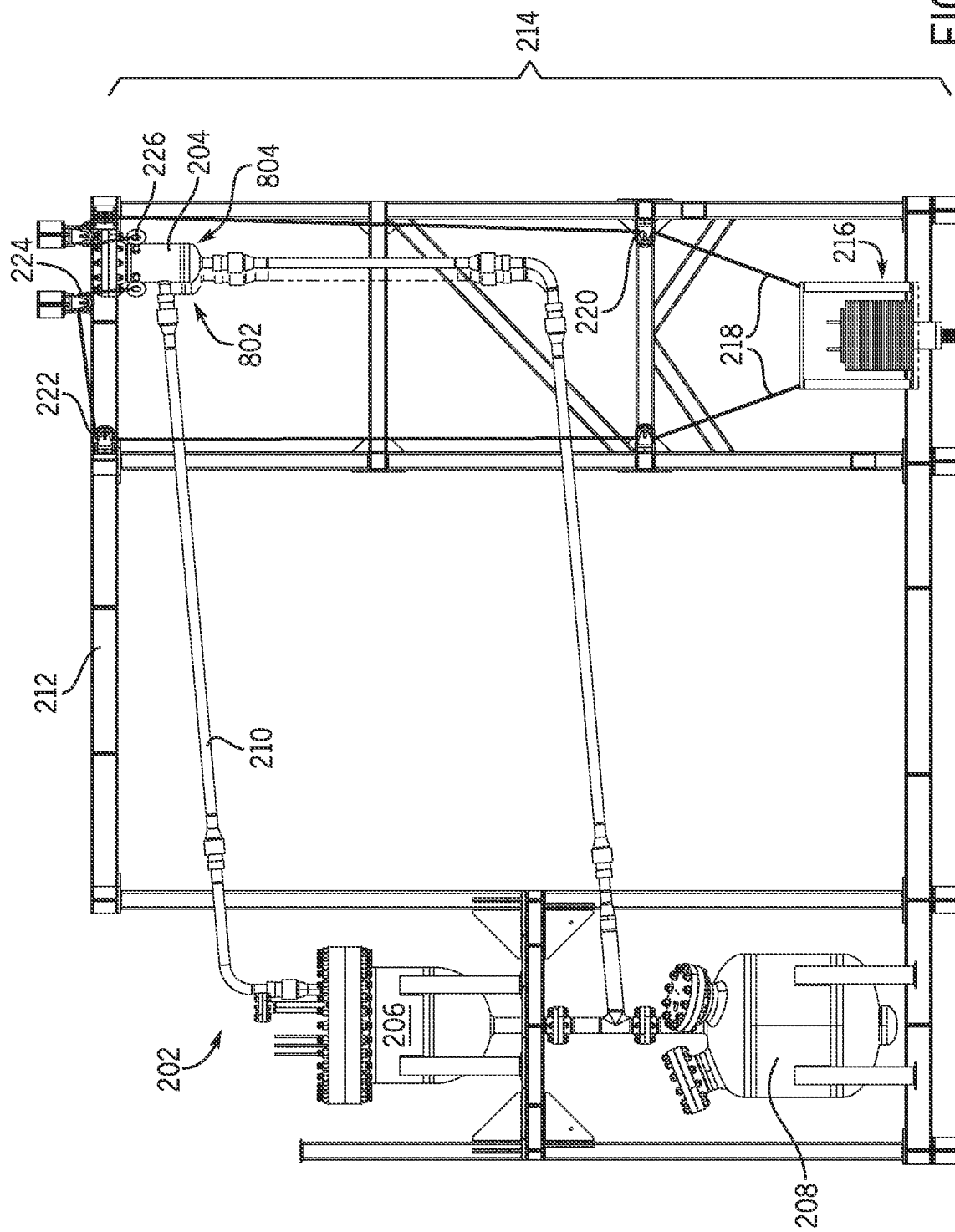
FIG. 8 illustrates a side view of the example system of FIG. 2.
Figure 9:
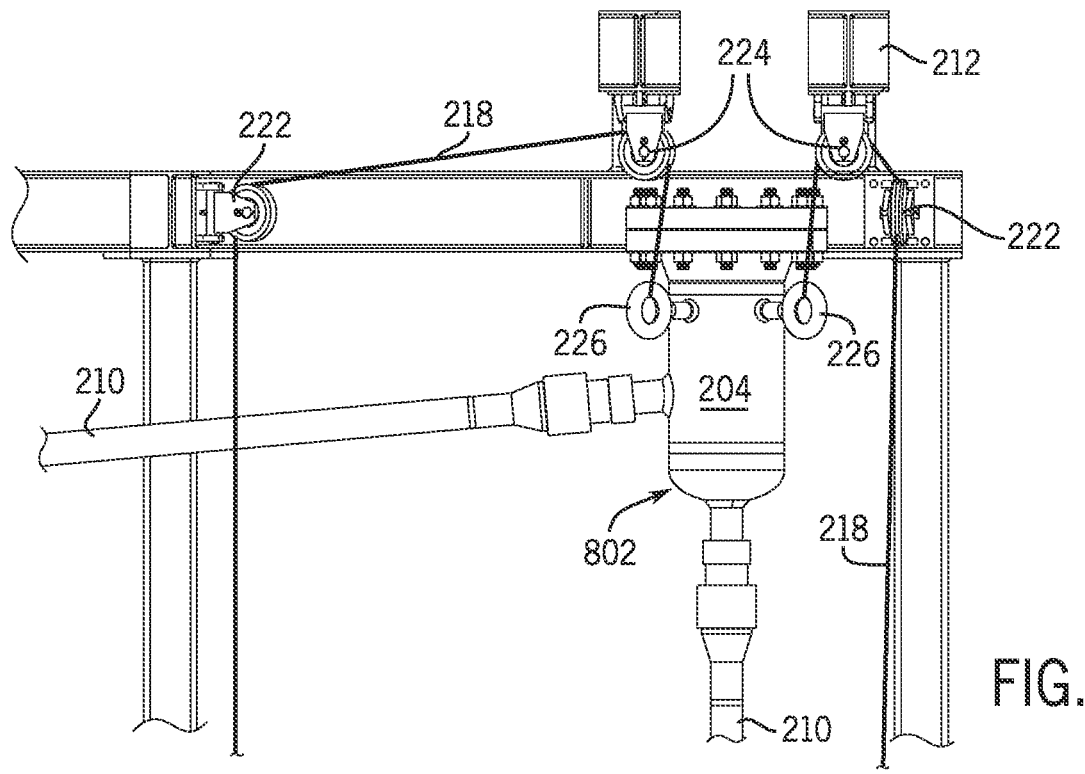
FIG. 9 illustrates a side view of the example system of FIG. 2 having a component in a first position, according to one embodiment of the present disclosure.
Figure 10:
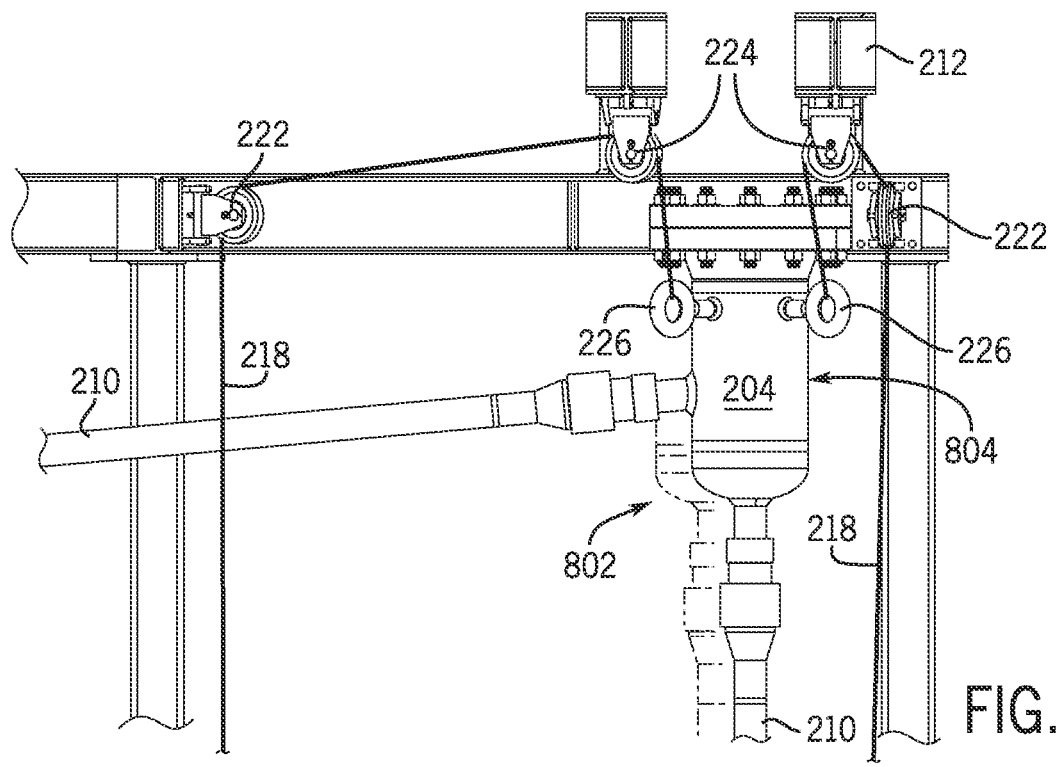
FIG. 10 illustrates a side view of the example system of FIG. 2 having the component in a second position, according to one embodiment of the present disclosure.

In various embodiments, as shown in FIGS. 8-10, as the loop 202 undergoes thermal expansion, the resulting stress forces caused by the thermal expansion causes the component 204 and/or piping segments 210 to move from a first position or configuration 802 to a second position or configuration 804, whereas the component 204 would not be able to move if rigidly attached to the support structure 212. In one or more embodiments, the first position 802 may be a position that the component 204 and/or piping segments 210 are in (in the X-Y-Z coordinate system) relative to the other components 206 and 208 and support structure 212, and the second position 804 may be a position that component 204 and/or piping segments 210 are in (in the X-Y-Z coordinate system) that the component 204 and/or piping segments 210 moved to due to thermal expansion due to a temperature change in the material of the loop 202. For example, the thermal expansion may cause the component to move from the first position 802 to a second position 804 that is three inches higher, four inches to the left horizontally, and two inches deeper than the first position 802. In at least one embodiment, the component 204 and/or piping segments 210 may thereafter move to a third position, and then to a fourth position, and so on, wherein each new position of the component 204 and/or piping segments 210 is the second position 804 relative to the preceding position of the component 204 and/or piping segments 210. In one embodiment, the component 204 and/or piping segments 210 may be generally continuously moving. As the component 204 is moving and connected to the thermal expansion support system 214, the counterweight 216 is also moving vertically in an opposite direction (e.g., if the component 204 moves upwards, the counterweight 216 will move downwards), supporting the weight of the component 204.

FIG. 9 shows the component 204 and piping segments 210 in the first configuration 802, and FIG. 10 shows the component 204 and piping segments 210 in the second configuration 804. As the temperature increases within the loop 202, piping segments 210 and components 206, 208, and 204 undergo thermal expansion and cause the component 204 and piping segments 210 to move to the second configuration 804. In conventional systems, the components and piping segments are not able to move, as they are rigidly attached to support structures, or may only move in a single direction. However, in the present disclosure, by utilizing the thermal expansion support system 214, the loop 202 may freely move, which decreases the stress caused by thermal expansion of the components 204, 206, and 208, and piping segments 210, as the counterweight 216 is structurally supporting the component 204, and thus, the loop 202.

Figure 11A:
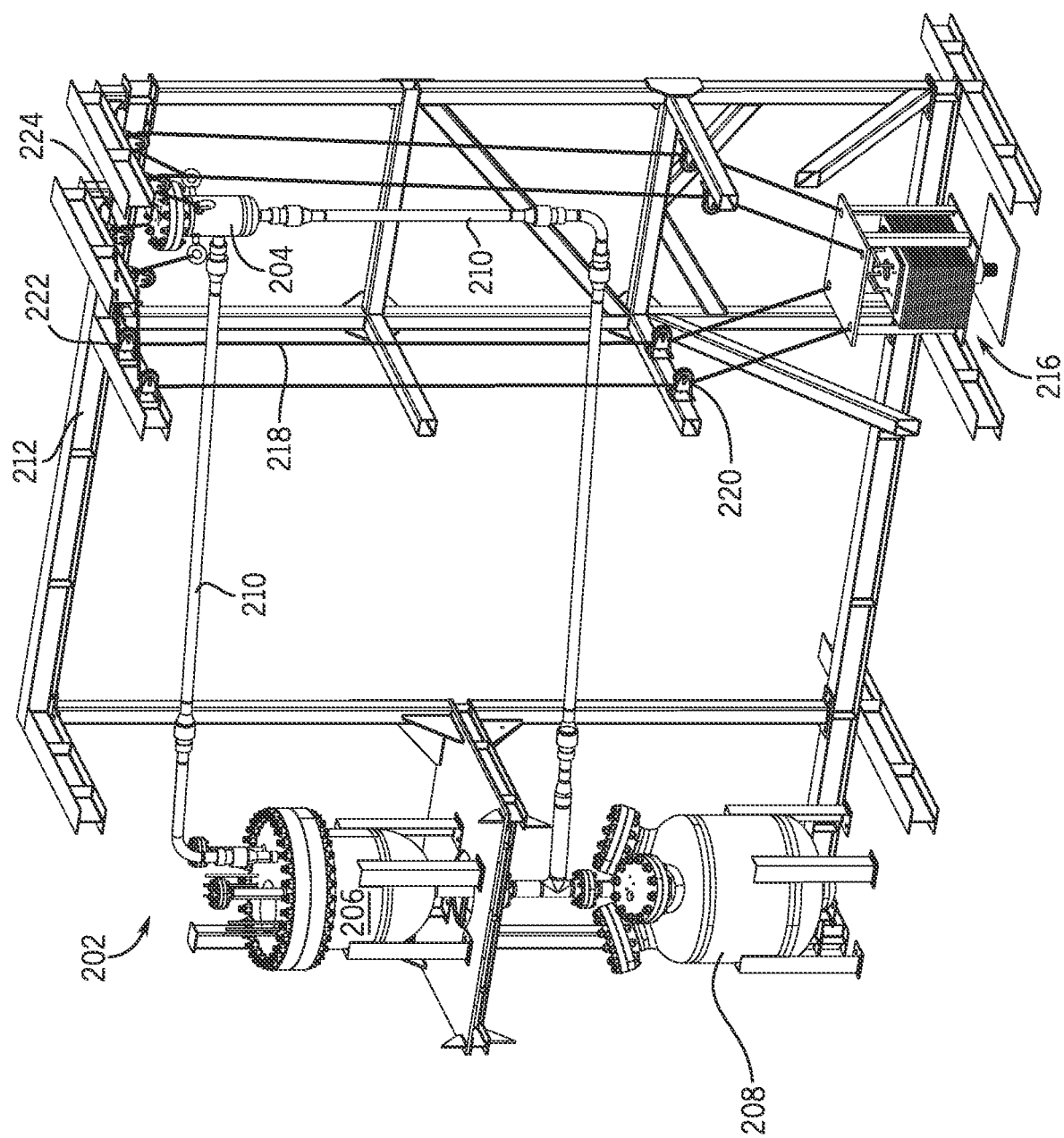
FIG. 11A illustrates a perspective view of an example system with an example thermal expansion support system, according to one embodiment of the present disclosure.
Figure 11B:
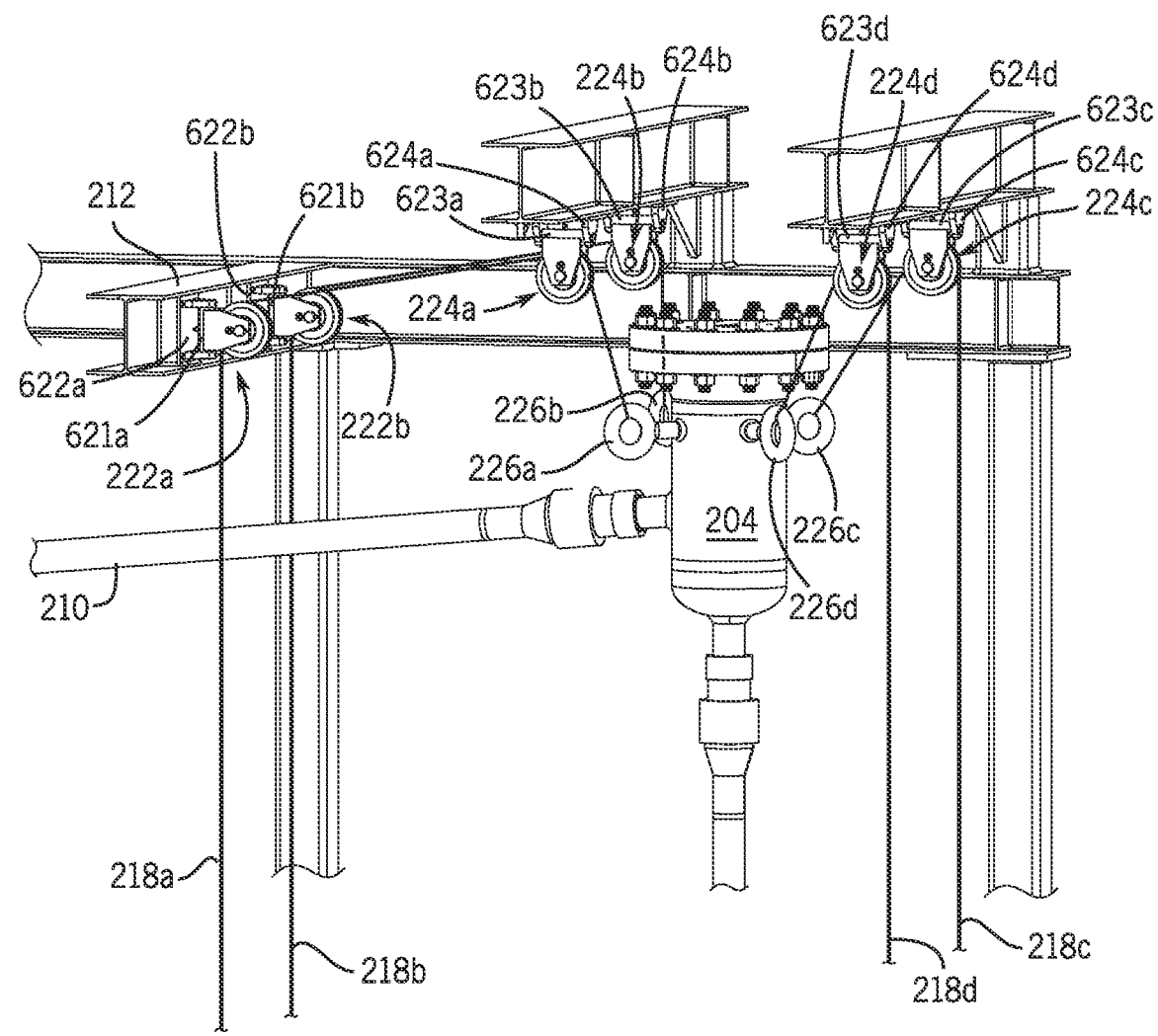
FIG. 11B illustrates a perspective view of the example system of FIG. 11A.
Figure 11C:
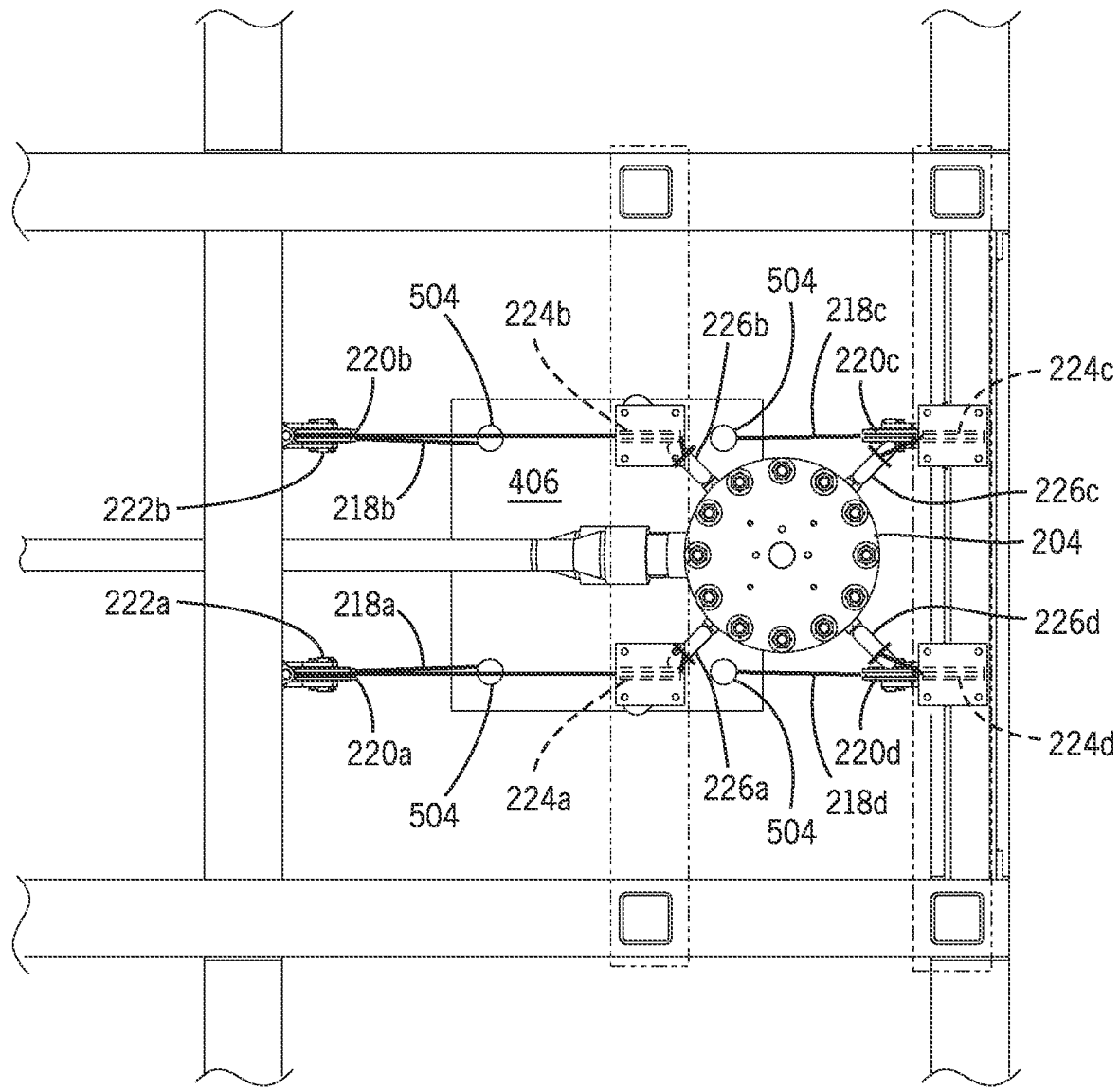
FIG. 11C illustrates a top view of the example system of FIG. 11A.

Turning to FIGS. 11A, 11B, and 11C, perspective and top views of an example system 202 with an example thermal expansion support system 214 that utilizes ten pulleys, according to one embodiment of the present disclosure. The example thermal expansion support system 214, as shown in FIGS. 11A-C, utilize ten pulleys rather than twelve pulleys (does not include pulleys 222c and 222d as shown in FIGS. 6-7). As shown in FIGS. 11A-C, the thermal expansion support system 214 has two cords 218c-d that extend through pulleys 220c-d and 224c-d, and has two other cords 218a-b that extend through pulleys 220a-b, 222a-b, and 224a-b. Further, the support structure 212 that is located above the component 204 is shifted so that the pulleys 224c-d are directly above the pulleys 220c-d.

In multiple embodiments, as shown in FIGS. 12-16, example thermal expansion support systems of a high temperature fluid system may include one or more active system components to provide structural support and counterbalancing forces to the high temperature system, rather than the counterweight 216 of thermal expansion support system 214. In several embodiments, the active system components may be operatively and electrically connected to at least one control device (e.g., control device 1504, computer 1510, or control system 1604) that utilizes temperature measurement devices to determine a counterbalancing force that the one or more active system components can apply to the certain points on the high temperature system to structurally support the high temperature system and to decrease the stress induced by the thermal expansion of the high temperature system. In at least one embodiment, the active system components may be physically connected to at least one support point of the high temperature system so that, when the one or more active system components are signaled to activate, the stress caused by thermal expansion of the loop is decreased by moving the at least one support point on the high temperature system from a first configuration to a second configuration. In one or more embodiments, the temperature measurement devices (e.g., thermocouples), may measure the temperature of the material inside the system, and as the temperature of the material changes, the at least one control device send signals to the one or more active system components to adjust the position of the at least one support point of the high temperature system in a vertical and/or horizontal direction, in order to decrease the stress on the high temperature system.

Figure 12:
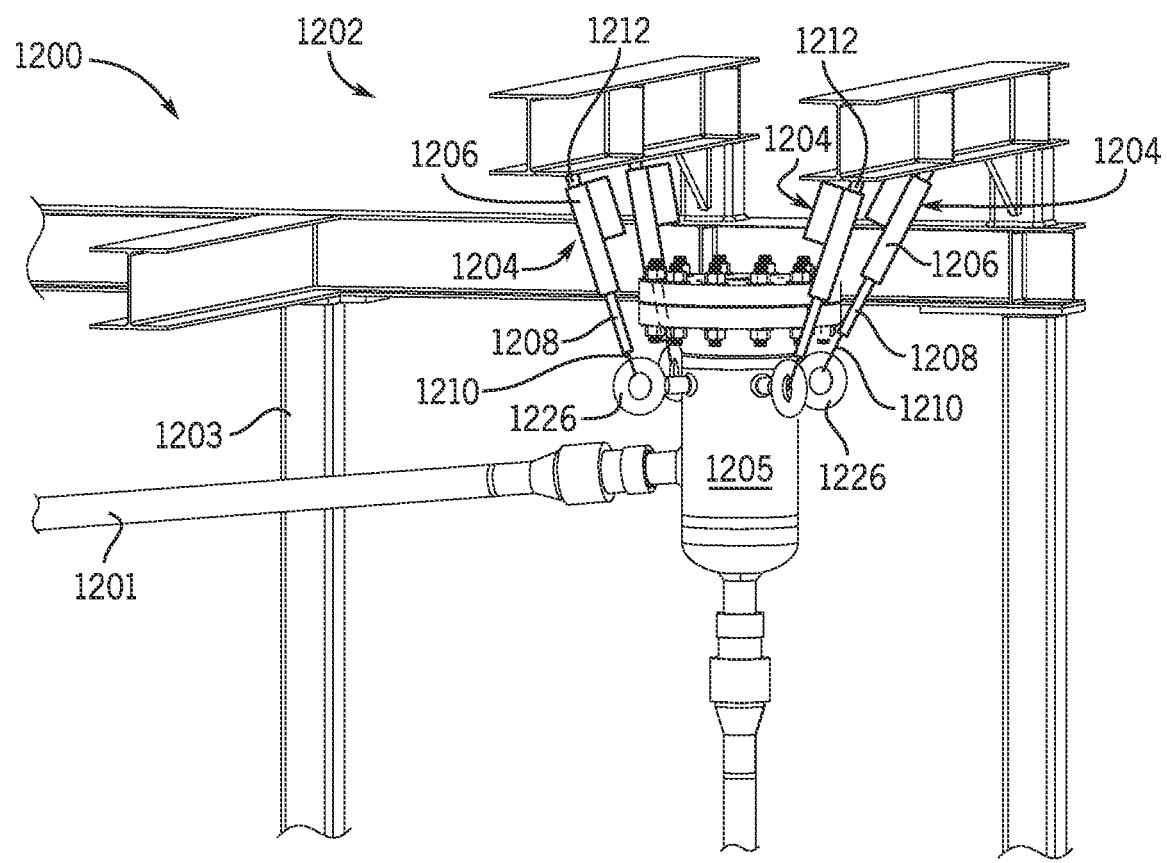
FIG. 12 illustrates a perspective view of another example system with another example thermal expansion support system, according to one embodiment of the present disclosure.

Turning to FIG. 12, an example thermal expansion support system 1202 is shown connected to fluid loop 1200, according to one embodiment of the present disclosure. In various embodiments, the thermal expansion support system 1202 includes one or more active system components 1204 connected to the support structure 1203 above the component 1205 (e.g., located in a generally similar area as the one or more pulleys 224 of FIG. 6) and also connected to the one or more loop connection devices 1226 that are attached to the component 1205. However, it will be appreciated that any configuration of the structural support 1203, and thus any positioning of the one or more active system components 1204 on the structural support 1203, is within the scope of this disclosure.

The one or more active system components 1204 may be operatively connected to one or more control devices (e.g., a control device 1504 or a control system 1604, as described herein) that controls the one or more active system components 1204 to apply a certain determined counterbalancing force onto the component 1205 via the one or more loop connection devices 1226. In many embodiments, the one or more active system components 1204 may be actuators, hydraulic systems, pneumatic systems, electric motors or any other device that can receive a signal from a control device and apply a counterbalancing force to a support point (e.g., the component 1205) based on the received signal. In certain embodiments, the one or more active system components 1204 may be made of heat resistant material, such as stainless steel or other similar materials that can resist extreme internal temperatures (e.g., 700° C. or more).

In several embodiments, the one or more active system components 1204 may include a component body 1206 that is connected to the structural support 212 via a component base 1212. In some embodiments, the component base 1212 may be connected to the structural support via welding or fasteners, such as bolts. In one embodiment, the component base 1212 may allow for the one or more active system components 1204 to rotate at the component base 1212 so that the component 1205 has a greater degree of movement relative to the one or more active system components 1204. In many embodiments, the one or more active system components 1204 may also include a shaft 1208 extending from the component body 1206 at an end opposite the component base 1212. The shaft 1208 may be connected to a cord of one or more cords 1210 that is substantially analogous to the one or more cords 218. The one or more cords 1210 are connected at a first end to the shaft 1208 and at a second end to the one or more loop connection devices 1226.

In at least one embodiment, the one or more active system components 1204 may contract the shaft 1208 to apply an increased counterbalancing force on the component 1205, and may extend the shaft 1208 to apply a decreased counterbalancing force on the component 1205. However, in an alternate embodiment, the one or more active system components 1204 may not utilize a shaft 1208 if, for example, the one or more active system components 1204 are electric motors. In this case, the electric motors may rotate or otherwise wind and unwind the one or more cords 1210 to apply counterbalancing forces to the component 1205.

In several embodiments, the counterbalancing force to be applied is based on the temperature of the material within the fluid loop 1200, and is determined by a control system or control device (e.g., control device 1504, computer 1510, or control system 1604). In one embodiment, the active system components 1204 apply a force to the component 1205 to move the component 1205 from a first position (e.g., first position 802) to a second position (e.g., second position 804) in an X-Y-Z coordinate space to decrease the stress on the fluid loop 1200 caused by thermal expansion. Accordingly, the operation of the active system components 1204 may allow for dynamic adjustments in substantially real time, which may be beneficial in order to account for rapid changes in temperature within the loop 1200, and to anticipate the accompanying change in thermal stresses in the loop 1200.

In a preferred embodiment, as shown in FIG. 12, thermal expansion support system 1202 may include four active system components 1204, wherein each of the active system components 1204 are connected to a single cord of the one or more cords 1210, and each of the one or more cords 1210 is connected to a single, separate loop connection device of the one or more loop connection devices 1226. However, it will be appreciated that more or less active system components 1204 may be utilized, and the active system components 1204 may be connected to other components or piping segments of the loop 1200 for the purpose of reducing stress in the fluid loop 1200 caused by thermal expansion.

Figure 13:
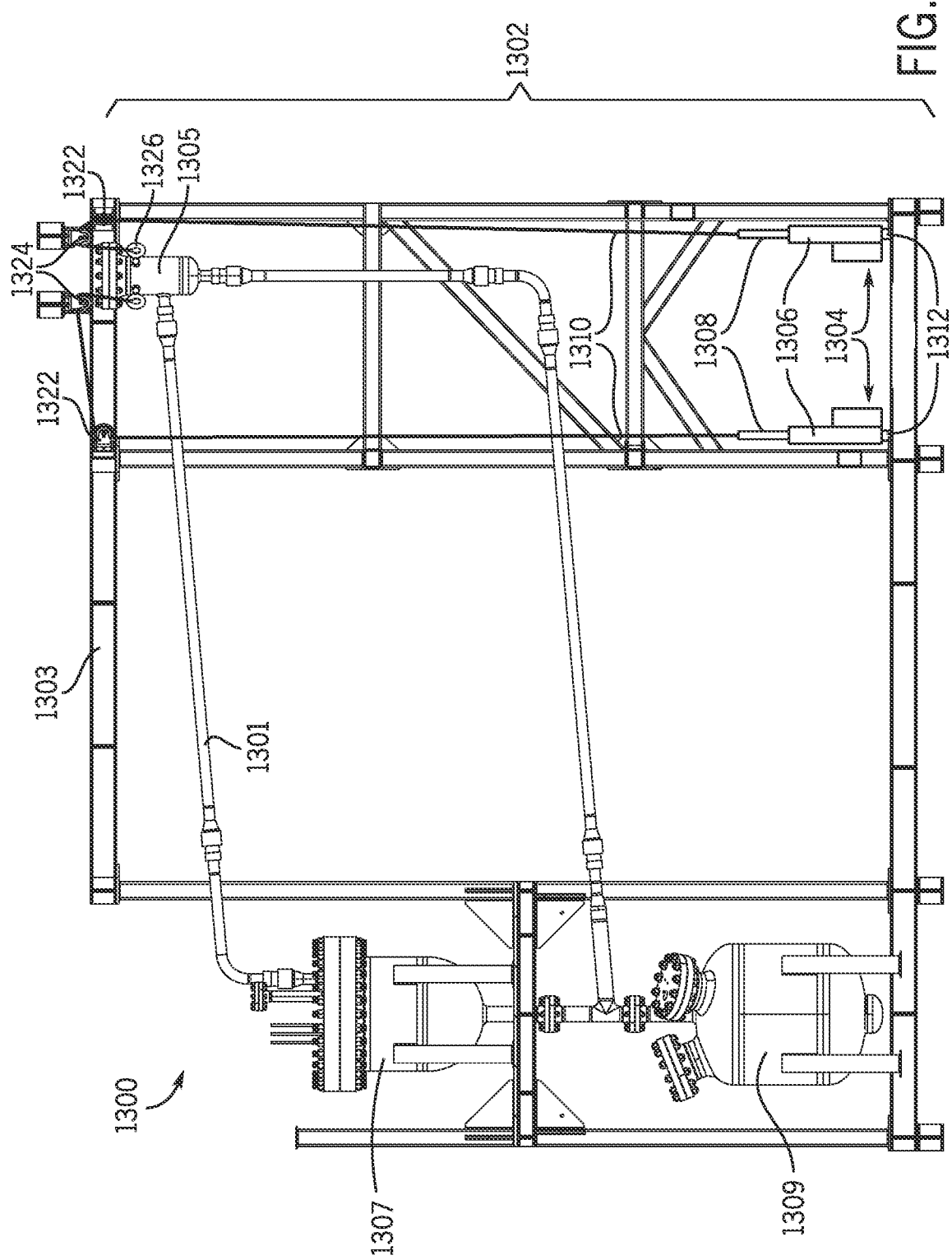
FIG. 13 illustrates a side view of another example system with another example thermal expansion support system, according to one embodiment of the present disclosure.

Turning to FIG. 13, another example high temperature system 1300 with an example thermal expansion support system 1302 is shown, according to one embodiment of the present disclosure. The high temperature system 1300 is substantially analogous to the high temperature system 202, and may be molten salt reactor system 100. In one or more embodiments, the thermal expansion support system 1302 of the high temperature system 1300 may include one or more active system components 1304. The one or more active system components 1304 are substantially analogous to the one or more active system components 1204, and include a component body 1306 connected to a shaft 1308 at one end of the component body 1306 and connected to a component base 1312 at an opposing end of the component body 1306. The component base 1312 is attached to the structure 1303. One or more cords 1310 (which are substantially analogous to the one or more cords 218) are connected at one end to the one or more active system components 1304 via the shaft 1308, and a second end passes through one or more pulleys 1322, 1324 and connect to the one or more loop connection devices 1326 that are attached to component 1305.

The one or more active system components 1304 may contract the shaft 1308 to apply an increased counterbalancing force on the component 1305, and may extend the shaft 1308 to apply a decreased counterbalancing force on the component 1305. However, in an alternate embodiment, the one or more active system components 1304 may not utilize a shaft 1308 if, for example, the one or more active system components 1304 are electric motors. In this case, the electric motors may rotate or otherwise wind and unwind the one or more cords 1310 to apply counterbalancing forces to the component 1305.

In several embodiments, the counterbalancing force to be applied is based on the temperature of the material within the fluid loop 1300, and is determined by a control system or control device (e.g., control device 1504, computer 1510, or control system 1604). In one embodiment, the active system components 1304 apply a force to the component 1305 to move the component 1305 from a first position (e.g., first position 802) to a second position (e.g., second position 804) in an X-Y-Z coordinate space to decrease the stress on the fluid loop 1300 caused by thermal expansion. Accordingly, the operation of the active system components 1304 may allow for dynamic adjustments in substantially real time, which may be beneficial in order to account for rapid changes in temperature within the loop 1300, and to anticipate the accompanying change in thermal stresses in the loop 1300.

In a preferred embodiment, thermal expansion support system 1302 may include four active system components 1304 (as shown in FIG. 13, two active system components 1304 are directly behind the shown two active system components 1304), wherein each of the active system components 1304 are connected to a single cord of the one or more cords 1310, and each of the one or more cords 1310 is passed through two pulleys of the one or more pulleys 1322 and 1324 (e.g., pulley 1322*a* and pulley 1324*a*) and is connected to a single, separate loop connection device (e.g., loop connection device 1326*a*) of the one or more loop connection devices 1326. However, it will be appreciated that more or less active system components 1304 and other components may be utilized, and the active system components 1304 may be connected to other components (e.g., component 1307 or 1309) or piping segments 1301 of the loop 1300 for the purpose of reducing stress in the fluid loop 1300 caused by thermal expansion.

Figure 14:
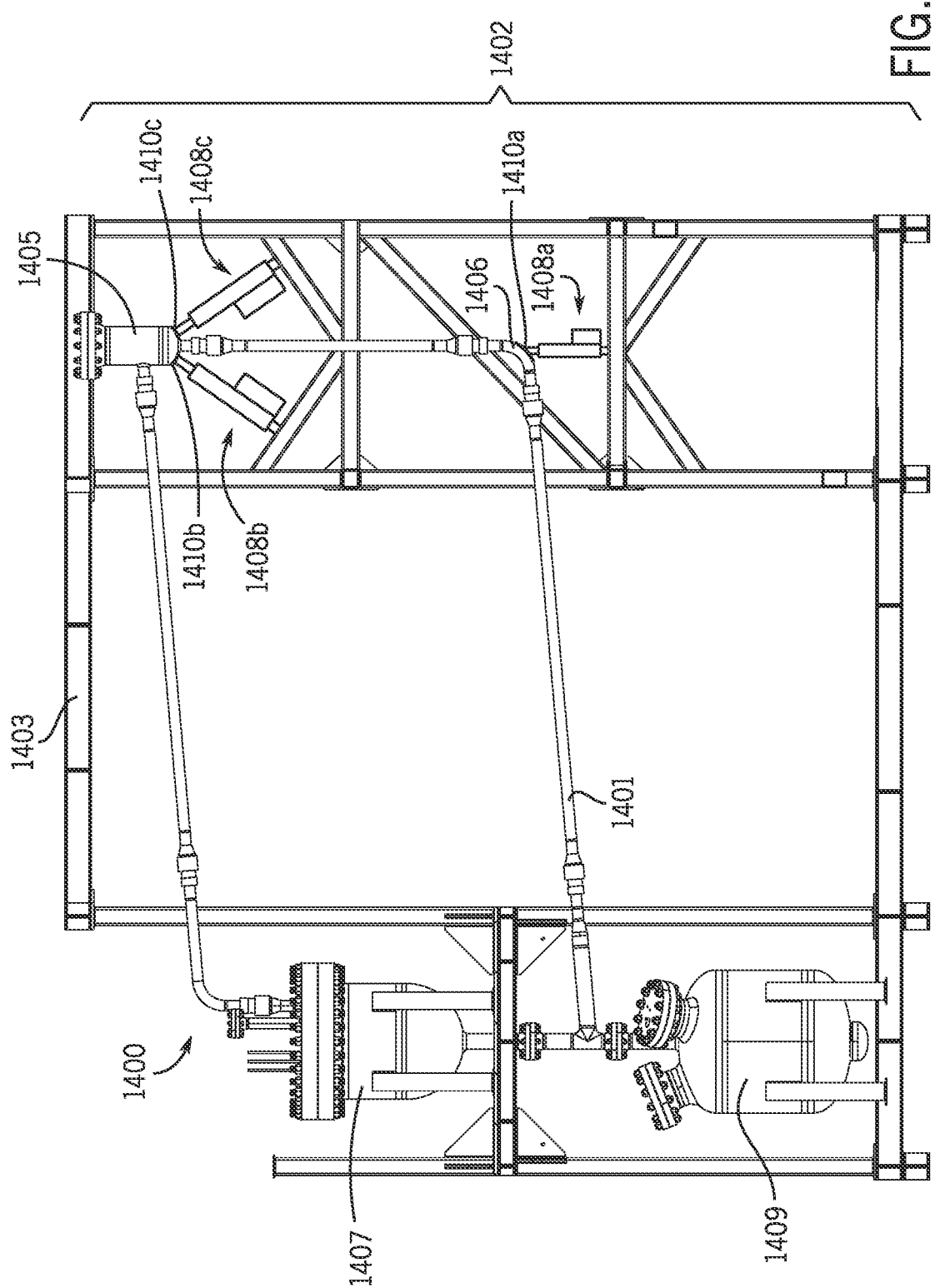
FIG. 14 illustrates a side view of another example system with another example thermal expansion support system, according to one embodiment of the present disclosure.

Turning to FIG. 14, another example high temperature system 1400 with an example thermal expansion support system 1402 is shown, according to one embodiment of the present disclosure. The high temperature system 1400 is substantially analogous to the high temperature system 202, and may be molten salt reactor system 100. In one or more embodiments, the thermal expansion support system 1402 of the high temperature system 1400 may include one or more active system components 1408. In one embodiment, the one or more active system components 1408 may include active system components 1408*a*, 1408*b*, and 1408*c*. The one or more active system components 1408 are substantially analogous to the one or more active system components 1204, and include a component body connected to a shaft at one end of the component body and connected to a component base at an opposing end of the component body. However, the one or more active system components 1408 do not utilize cords, such as the one or more cords 1310, pulleys, or loop connection devices, but instead include a contact plate 1410 attached to the end of the shaft opposite the end attached to the component body of each active system component 1408*a-c* (contact plate 1410*a* corresponding to component 1408*a*, contact plate 1410*b* corresponding to component 1408*b*, and contact plate 1410*c* corresponding to component 1408*c*). The contact plate 1410 directly contacts a support point on the high temperature system 1400, such as a piping segment 1401 and component 1405. In at least one embodiment, each contact plate 1410*a-c* may be formed to fit the shape of the support point on the loop. For example, a support point may be a circular pipe connector, and the contact place may be a semi-circular shape so that it can accept the diameter of the pipe connector and provide better support.

The one or more active system components 1408*a-c* may extend the shaft to apply an increased counterbalancing force via the contact plates 1410*a-c* on the component 1405 and piping segments 1401, and may contract the shaft to apply a decreased counterbalancing force via the contact plate 1410 on the component 1405.

In several embodiments, the counterbalancing force to be applied is based on the temperature of the material within the fluid loop 1400, and is determined by a control system or control device (e.g., control device 1504, computer 1510, or control system 1604). In one embodiment, the active system components 1408*a-c* apply a force to the component 1405 and piping segment 1401 to move the component 1405 and piping segment 1401 from a first position (e.g., first position 802) to a second position (e.g., second position 804) in an X-Y-Z coordinate space to decrease the stress on the fluid loop 1400 caused by thermal expansion. Accordingly, the operation of the active system components 1408*a-c* may allow for dynamic adjustments in substantially real time, which may be beneficial in order to account for rapid changes in temperature within the loop 1400, and to anticipate the accompanying change in thermal stresses in the loop 1400.

In a preferred embodiment, thermal expansion support system 1402 may include three active system components 1408*a-c* (as shown in FIG. 13), wherein the active system component 1408*a* is connected to a piping segment 1401 via a contact plate 1410*a* shaped to conform to the shape of the piping segment 1401, and the active system components 1408*b-c* are connected to component 1405, each via a contact plate 1410*b-c* shaped to conform to the shape of the contact area of the component 1405. However, it will be appreciated that more or less active system components 1408 and other components may be utilized, and the active system components 1408 may be connected to other components (e.g., component 1407 or 1409) or piping segments 1401 of the loop 1400 for the purpose of reducing stress in the fluid loop 1400 caused by thermal expansion.

Figure 15:
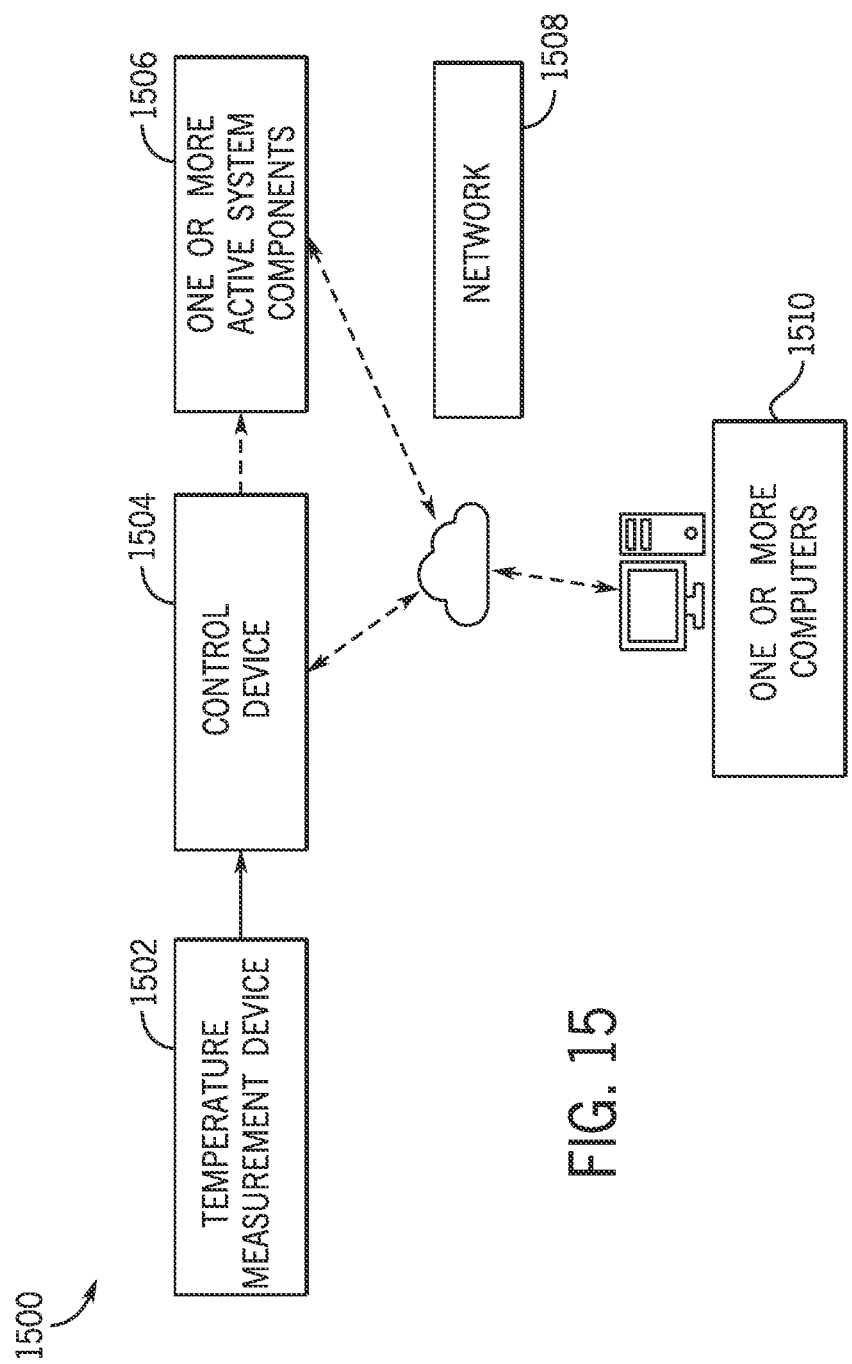
FIG. 15 depicts an example functional diagram of another example thermal expansion support system, according to one embodiment of the present disclosure.

Turning to FIG. 15, a functional diagram 1500 of the thermal expansion support systems 1202, 1302, and 1402 is shown, according to one embodiment of the present disclosure. In at least one embodiment, the diagram 1500 includes at least one temperature measurement device 1502 (e.g., a thermocouple) that measures the temperature of the material at a certain point within a high temperature system, such as loop 202, loop 1300, and/or loop 1400, and sends the temperature reading to one or more control devices 1504. The temperature reading may be an electronic signal that corresponds to the temperature of the material in the high temperature system, and the control device 1504 may read or interpret the electronic signal of the temperature reading. the received temperature readings from the multiple temperature measurement devices 1502. In one or more embodiments, the control device 1504 may then determine a certain counterbalancing force to be applied to the high temperature system based on the temperature of the material, and send an activation signal to one or more active system components 1506 (such as active system components 1204, 1304, and 1408*a-c*) indicating the specified counterbalancing force to be applied. In many embodiments, the control device 1504 may be operatively connected to only one active system component 1506 so that when the control device 1504 sends a signal, only the one active system component 1506 activates. In another embodiment, the control device 1504 may be connected to a plurality of active system components 1506, and may control the activation of one or more than one active system component 1506, depending on the needs of the system 1500.

In some embodiments, if multiple temperature measurement devices 1502 are utilized, the control device 1504 may utilize the multiple temperature readings received from the multiple temperature measurement devices 1502 to determine one or more counterbalancing forces to be applied by the one or more active system components 1506. In at least one embodiment, the one or more active system components 1506 may receive the signal at a processor of the one or more active components 1508 and activate and apply the specified counterbalancing force onto the high temperature system at a certain support point that the one or more active system components 1506 is in contact with.

Alternatively, the control device 1504 may be operatively connected to one or more computers 1510 via a network 1508, and may send the temperature readings to the one or more computers 1510 via the network 1508. In many embodiments, the one or more computers 1510 may determine the force needed to be applied by the one or more active system components 1506. In one embodiment, the one or more computers 1510 may send a signal indicating the force to be applied by the active system components 1506 to either the control device 1504 or to the one or more active system components 1506. If the one or more computers 1510 sends a signal indicating the force to be applied back to the control device 1504, the control device 1504 may thereafter send the signal to the one or more active system components 1506.

Figure 16:
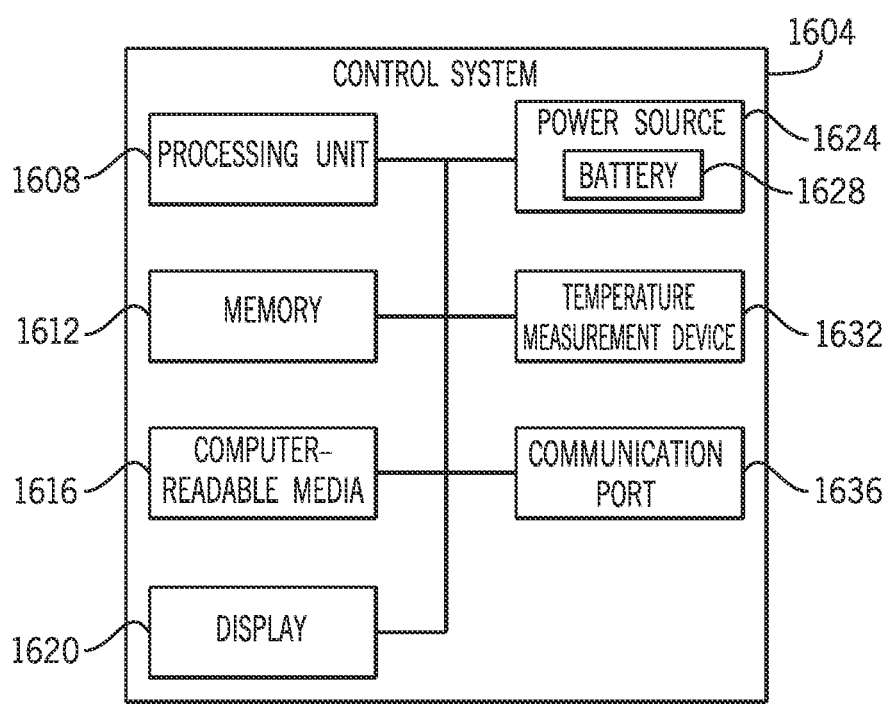
FIG. 16 depicts an example functional block diagram of a device for operating an example thermal expansion support system, according to one embodiment of the present disclosure.

FIG. 16 presents an illustrative control system 1604. The schematic representation in FIG. 16 may be substantially analogous to the system 1500 described above with respect to FIG. 15. However, FIG. 16 may also more generally represent other types of devices and configurations that may be used to receive a user input signal from an input device in accordance with the examples described herein. In this regard, the control system 1604 may include any appropriate hardware (e.g., computing devices, data centers, switches), software (e.g., applications, system programs, engines), network components (e.g., communication paths, interfaces, routers) and the like (not necessarily shown in the interest of clarity) for use in facilitating any appropriate operations disclosed herein.

As shown in FIG. 16, the control system 1604 may include a processing unit or element 1608 that is operatively connected to computer memory 1612 and computer-readable media 1616. The processing unit 1608 may be operatively connected to the memory 1612 and computer-readable media 1616 components via an electronic bus or bridge (e.g., such as system bus 1620). The processing unit 1608 may include one or more computer processors or microcontrollers that are configured to perform operations in response to computer-readable instructions. The processing element 1608 may be a central processing unit of the control system 1604.

The memory 1612 may include a variety of types of non-transitory computer-readable storage media, including, for example, read access memory (RAM), read-only memory (ROM), erasable programmable memory (e.g., EPROM and EEPROM), or flash memory. The memory 1612 is configured to store computer-readable instructions, sensor values, and other persistent software elements. Computer-readable media 1616 may also include a variety of types of non-transitory computer-readable storage media including, for example, a hard-drive storage device, a solid state storage device, a portable magnetic storage device, or other similar device. The computer-readable media 1616 may also be configured to store computer-readable instructions, sensor values, and other persistent software elements.

In this example, the processing unit 1608 is operable to read computer-readable instructions stored on the memory 1612 and/or computer-readable media 1616. The computer-readable instructions may adapt the processing unit 1608 to perform the operations or functions described above with respect to FIGS. 12-15. The computer-readable instructions may be provided as a computer-program product, software application, or the like.

As shown in FIG. 16, the control system 1604 may also include a display 1620. The display 1620 may include a liquid-crystal display (LCD), organic light emitting diode (OLED) display, light emitting diode (LED) display, or the like. If the display 1620 is an LCD, the display may also include a backlight component that can be controlled to provide variable levels of display brightness. If the display 1620 is an OLED or LED type display, the brightness of the display 1620 may be controlled by modifying the electrical signals that are provided to display elements. The control system 1604 may also include a power source 1624, which may include, but is not limited to, a battery 1628 that is configured to provide electrical power to the components of the control system 1604.

The control system 1604 may also include a temperature measurement device 1632. The temperature measurement device 1632 may be substantially analogous to any of the temperature measurement devices described herein, such as the temperature measurement device 1502 described above with respect to FIG. 15. The control system 1604 may also include a communication port 1636 that is configured to transmit and/or receive signals or electrical communication from an external or separate device. The communication port 1636 may be configured to couple to an external device via a cable, adaptor, or other type of electrical connector. In some embodiments, the communication port 1636 may be used to couple the control system 1604 with a computing device and/or other appropriate accessories configured to send and/or receive electrical signals.

Figure 17:
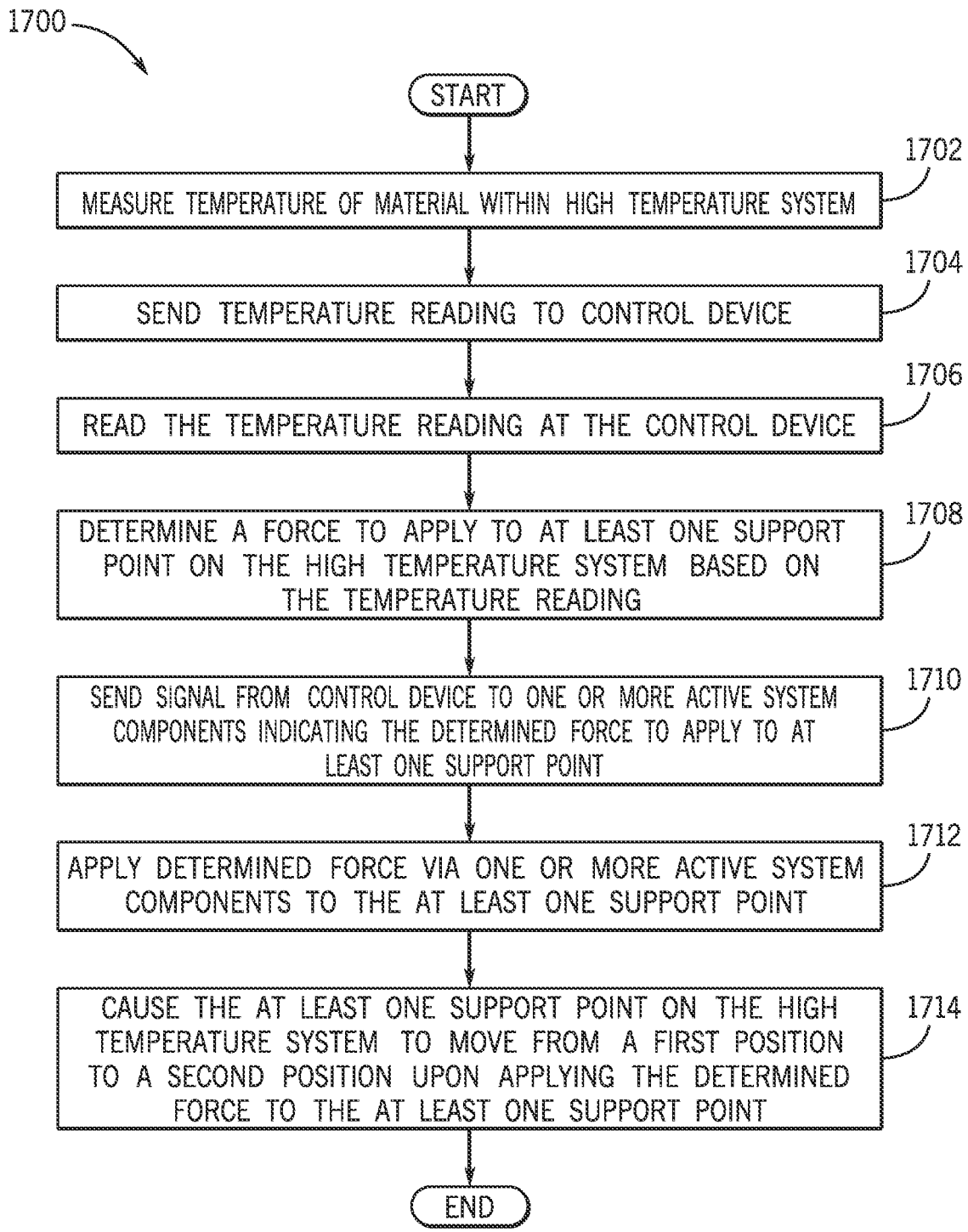
FIG. 17 depicts a method for counterbalancing stress in a system caused by thermal expansion, according to one embodiment of the present disclosure.

Turning to FIG. 17, a method 1700 for counterbalancing stress in a high temperature system caused by thermal expansion is described, according to one embodiment of the present disclosure. In multiple embodiments, the high temperature system may be loop 1300 and/or 1400, or any other high temperature system in which thermal expansion stresses the components of the high temperature system. At step 1702, the material within the high temperature system is measured. In some embodiments, the temperature may be measured by one or more temperature measurement devices 1502, or any other device that can measure temperature of a fluid flowing in a high temperature system. In one or more embodiments, the one or more temperature measurement devices 1502 may be placed at certain points within the piping segments 210, components 204, 206, and/or 208, to measure the temperature of the material within the high temperature system at those certain points.

In one or more embodiments, at step 1704, the temperature measurement devices 1502 may send a signal or signals that are associated with the temperature reading to one or more control devices, such as control device 1504 (and the functionally equivalent control system 1604). At step 1706, in many embodiments, the one or more control devices 1504 read the signals to get the temperature readings from the one or more temperature measurement devices 1502.

At step 1708, the control devices 1504 or a computer 1510 operatively connected to the control device 1504 via the network 1508 may determine a counterbalancing force to be applied to a at least one support point on the high temperature system based on the temperature reading. In certain embodiments, the control devices 1504 or computer 1510 may determine, based on multiple temperature readings received from multiple temperature measurement devices 1502, that different counterbalancing forces should be applied at separate support points (e.g., component 204, pipe bend 1306, or other points) on the high temperature system.

At step 1710, the control device 1504 or computer 1510 sends a signal to activate one or more active system components 1506 to apply the determined force at the at least one support point connected with the active system components 1506. In several embodiments, the active system components 1506 may be actuators, hydraulic systems, pneumatic systems, electric motors or any other device that can receive a signal from a control device and apply a counterbalancing force to a support point based on the received signal. In many embodiments, a high temperature system may have a plurality of active system components 1502 that are connected to different support points along the high temperature system. For example, fluid loop 1400 includes a thermal expansion support system 1402 that includes an active system component 1408a connected to pipe bend 1306 and active system components 1408b and 1408c connected to component 204. For these loops with multiple active system components 1506 connected to different support points, the determined force to be applied by the active system components may differ or be the same, depending on the temperature readings and needs of the system 1402 to counterbalance the stress caused by thermal expansion. Additionally, the force to be applied by the separate active system components may be determined utilizing different sets of the temperature readings from the one or more temperature devices 1502. For example, in relation to fluid loop 1400, the control devices 1504 may determine a force to be applied by active system components 1408b and 1408c based primarily on temperature readings from temperature measurement devices 1502 located in or near component 204 and 206, whereas the determined force to be applied by active system component 1408a may be based on temperature readings from temperature measurement devices 1502 located within the piping segments 210 on either end of the pipe bend 1306. However, any method of calculation of the determined force to be applied by the one or more active system components is within the scope of this disclosure.

At step 1712, the one or more active system components 1506 applies the determined force at the at least one support point. In applying the determined force, the active system components 1502 may extend or contract to apply a greater force or a lesser force on the at least one support point. For example, in the thermal expansion support system 1302, the active system components 1304 contract the shafts 1308 into the component body 1306 to apply an increased counterbalancing force on the support point (component 204) via the one or more pulleys 222 and 224 and one or more cords 1310, and extend the shafts 1308 to decrease the applied force on the support point. In another example, in the thermal expansion support system 1402, the active system component 1408a extends the shaft apply an increased counterbalancing force on the support point (pipe bend 1408), and contracts to decrease the applied force on the support point.

At step 1714, the active system components 1502 cause the at least one support point on the high temperature system to move from a first position (e.g., first position 802) to a second position (e.g., second position 804) upon applying the determined force to the at least one support point. In many embodiments, there is less stress on the components and piping segments of the high temperature system in the second position, relative to the first position.

Figure 18:
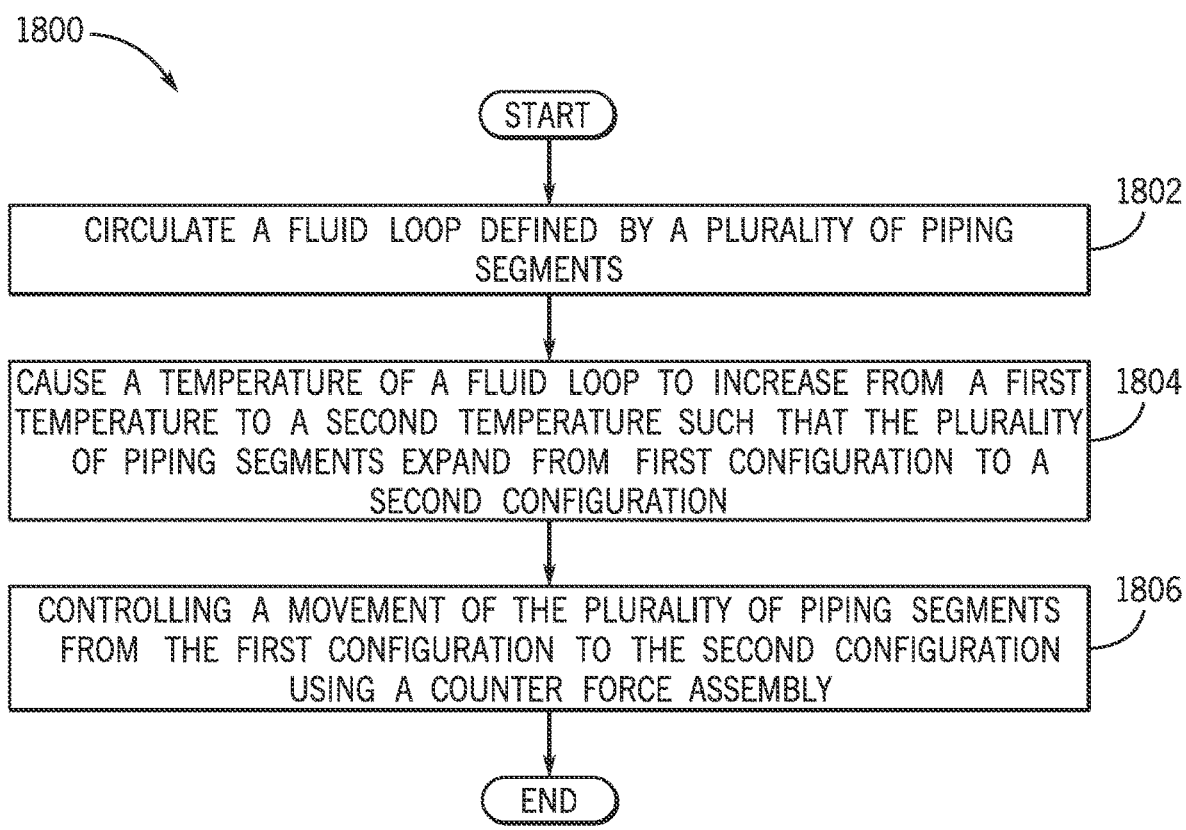
FIG. 18 depicts a method for operating an example thermal expansion support system, according to one embodiment of the present disclosure.

Turning now to FIG. 18, a method 1800 of operation of a thermal expansion support system is described, according to one embodiment of the present disclosure. At step 1802, a fluid or material is circulated in a fluid loop (e.g., fluid loop 202) that is defined by a plurality of piping segments 210. The fluid loop may have other components (e.g., components 204, 206, and/or 208) in fluid connection with the fluid loop.

At step 1804, in at least one embodiment, the temperature of the fluid loop is caused to increase from a first temperature to a second temperature such that the plurality of piping segments 210 expand from a first configuration (e.g., first configuration 802) to a second configuration (e.g., second configuration 804) due to thermal expansion of the plurality of piping segments 210. In several embodiments, to the extent any components are included on the fluid loop, the components may also expand from the first configuration to the second configuration. In many embodiments, the first temperature may be ambient temperatures, or any other temperature that is not the same as the second temperature. In some embodiments, the second temperature may be any temperature that causes the plurality of piping segments 210 to expand from the first configuration of the first temperature. In one embodiment, the second temperature may be the operating temperature of the fluid loop. In certain embodiments, the fluid loop may be heated by external heaters so that the material within the fluid loop will melt into a fluid or become a molten fluid.

At step 1806, in various embodiments, a counterweight assembly (such as counterweight 216) controls the movement of the plurality of piping segments and/or components of the fluid loop from the first configuration to the second configuration. In many embodiments, the counterweight assembly may be the counterweight 216. In some embodiments, the counterweight assembly may be attached to the plurality of piping segments via one or more cords 218, one or more pulleys 220, 222, and/or 224, and one or more loop connection devices 226, as described in relation to the thermal expansion support system 214.

Other examples and implementations are within the scope and spirit of the disclosure and appended claims. For example, features implementing functions may also be physically located at various positions, including being distributed such that portions of functions are implemented at different physical locations. The foregoing description, for purposes of explanation, uses specific nomenclature to provide a thorough understanding of the described examples. However, it will be apparent to one skilled in the art that the specific details are not required in order to practice the described examples. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. A system, comprising:
a vessel;
a first component coupled with the vessel and subject to thermal expansion during operation of the vessel; and
a thermal expansion support system coupled with the first component and configured to counterbalance the at least one component and relieve stress therein induced by the thermal expansion,
wherein the thermal expansion support system comprises a counterweight, and
wherein the thermal expansion support system further comprises:
one or more pulleys;
one or more cords; and
one or more loop connection devices connected to the first component.

2. The system of claim 1, wherein the one or more cords are attached at a first end to the counterweight and pass through the one or more pulleys, and are attached at a second end to the one or more loop connection devices, wherein the counterweight counterbalances the thermal stress of the first one component.

3. The system of claim 2, wherein the one or more pulleys comprises ten pulleys, the one or more cords comprises four cords, and the one or more loop connection devices comprises four loop connection devices.

4. The system of claim 3, wherein the first component moves from a first position to a second position as the system increases from a first temperature to a second temperature.

5. The system of claim 4, wherein the counterweight remains separated from a ground while the first component is in the second position.

6. The system of claim 1, further comprising:
a structural support system; and
a second component; and
wherein the vessel, first component, and second component are in fluid connection with a plurality of piping segments, defining a fluid loop.

7. The system of claim 6, wherein the thermal expansion support system comprises at least one actuator to counterbalance the thermal stress of the first component.

8. The system of claim 7, further comprising:
at least one thermocouple inside the vessel or first component; and
a processing unit;
wherein the processing unit is operatively connected to the at least one thermocouple and the at least one actuator.

9. The system of claim 8, wherein the processing unit receives temperature readings from the at least one thermocouple, and based on the temperature readings, transmits a communication to the at least one actuator to provide a counterbalancing force on the fluid loop to decrease stress caused by thermal expansion.

10. The system of claim 9, wherein the temperature readings received by the processing unit from the at least one thermocouple indicates an increase in temperature within the fluid loop, and the processing unit causes the at least one actuator to increase the counterbalancing force on the fluid loop.

11. The system of claim 10, wherein the increased counterbalancing force provided by the at least one actuator upon the increase in temperature within the fluid loop causes the first component to move from a first position to a second position.

12. The system of claim 9, wherein the temperature readings received by the processing unit from the at least one thermocouple indicates a decrease in temperature within the fluid loop, and the processing unit causes the at least one actuator to decrease the counterbalancing force on the fluid loop.

13. The system of claim 12, wherein the decreased counterbalancing force provided by the at least one actuator upon the decrease in temperature within the fluid loop causes the first component to move from a first position to a second position.

14. The system of claim 11, wherein the at least one actuator is in contact with at least one of a piping segment of the plurality of piping segments or the first component, and wherein the at least one actuator actuates to move the first component from the first position to the second position.

15. The system of claim 11, wherein the thermal expansion support system further comprises:
    a plurality of pulleys connected to the structural support system;
    one or more loop connection devices, wherein the one or more loop connection devices are connected to the first component; and
    one or more cords, wherein the one or more cords are attached at a first end to the at least one actuator and pass through the plurality of pulleys, and are attached at a second end to the one or more loop connection devices;
    wherein the at least one actuator is extended when the first component is in the first position.

16. The system of claim 15, wherein the at least one actuator retracts to move the first component from the first position to the second position.

* * * * *